US010293309B2

(12) United States Patent
Tachibana et al.

(10) Patent No.: US 10,293,309 B2
(45) Date of Patent: May 21, 2019

(54) METHOD, A BUBBLE GENERATING NOZZLE, AND AN APPARATUS FOR GENERATING MICRO-NANO BUBBLES

(71) Applicant: SIGMA-TECHNOLOGY INC., Hitachinaka-shi (JP)

(72) Inventors: Yoshiaki Tachibana, Hitachinaka (JP); Kousuke Tachibana, Hitachinaka (JP); Kaoru Harada, Hitachinaka (JP); Souzou Sasajima, Hitachinaka (JP); Kunihiro Tamahashi, Hitachinaka (JP); Kyoko Honma, Hitachinaka (JP); Yuuki Matsumoto, Hitachinaka (JP)

(73) Assignee: SIGMA-TECHNOLOGY INC., Ibaraki, Hitachinaka-Shi (JP)

( * ) Notice: Subject to any disclaimer, the term of this patent is extended or adjusted under 35 U.S.C. 154(b) by 582 days.

(21) Appl. No.: 14/433,705

(22) PCT Filed: Jun. 13, 2013

(86) PCT No.: PCT/JP2013/066902

§ 371 (c)(1),
(2) Date: Apr. 6, 2015

(87) PCT Pub. No.: WO2014/199525

PCT Pub. Date: Dec. 18, 2014

(65) Prior Publication Data

US 2015/0273408 A1 Oct. 1, 2015

(51) Int. Cl.
*B01F 3/04* (2006.01)
*C02F 1/72* (2006.01)
(Continued)

(52) U.S. Cl.
CPC ...... *B01F 3/04248* (2013.01); *B01F 3/04439* (2013.01); *B01F 3/04503* (2013.01);
(Continued)

(58) Field of Classification Search
CPC ........ B01F 3/04248; B01F 2003/04858; B01F 5/0256; B01F 5/0689; C02F 1/72; C02F 1/722; C02F 1/76; C02F 1/78
(Continued)

(56) References Cited

U.S. PATENT DOCUMENTS 4,994,242 A * 2/1991 Rae ...................... B01F 5/0256 138/37
2003/0230122 A1 12/2003 Lee
(Continued)

FOREIGN PATENT DOCUMENTS

JP 62-295663 12/1987
JP 2000-262876 9/2000
(Continued)

OTHER PUBLICATIONS

European Supplementary Search Report for Application No. 13886736.1, dated Apr. 8, 2016.

*Primary Examiner* — Marc C Howell

(57) ABSTRACT

A new method for generating micro-nano bubbles that uses water hammering, a bubble generating nozzle, and an apparatus for generating micro-nano bubbles are provided to construct a system. The system is for generating micro-nano bubbles in a large amount using only pure water, which does not include any nucleating agents, and for performing not only a clean washing and sterilization but also the generation of uncontaminated micro-nano bubbles. The method defined in the present invention uses water hammering power produced by a mutual collision of jets of dissolved-gas-including solution squirted from two or more spouts. The bubble generating nozzle by the present invention has a configuration, including: a hollow cylinder having two or more small through-holes arrayed in the circumferential direction thereof and a micro-nano bubble discharge port provided on the both ends of the hollow cylinder, wherein the small
(Continued)

through-holes are arranged so that all of their extension lines passing through respective center of the cross-section of each of the small through-holes which intersect each other in the inside of the hollow of the cylinder. The apparatus for generating bubble by the present invention has such bubble generating nozzle and has a configuration that enables generation of micro-nano bubbles in a large amount.

21 Claims, 23 Drawing Sheets

(51) Int. Cl.

| | |
|---|---|
| ***B01F 5/02*** | (2006.01) |
| ***B01F 5/06*** | (2006.01) |
| ***B01F 5/20*** | (2006.01) |
| ***B01F 15/00*** | (2006.01) |
| ***B01J 19/26*** | (2006.01) |
| ***B01J 7/00*** | (2006.01) |
| *C02F 1/76* | (2006.01) |
| *C02F 1/78* | (2006.01) |
| *C02F 1/34* | (2006.01) |
| *D06F 35/00* | (2006.01) |

(52) U.S. Cl.
CPC .......... *B01F 5/0256* (2013.01); *B01F 5/0689* (2013.01); *B01F 5/20* (2013.01); *B01F 15/00538* (2013.01); *B01F 15/00545* (2013.01); *B01J 7/00* (2013.01); *B01J 19/26* (2013.01); *C02F 1/72* (2013.01); *B01F 2003/04858* (2013.01); *B01F 2215/008* (2013.01); *B01J 2219/00162* (2013.01); *C02F 1/34* (2013.01); *C02F 1/722* (2013.01); *C02F 1/76* (2013.01); *C02F 1/78* (2013.01); *C02F 2303/04* (2013.01); *D06F 35/002* (2013.01)

(58) Field of Classification Search
USPC ....................................................... 366/162.4
See application file for complete search history.

(56) References Cited

U.S. PATENT DOCUMENTS

| | | | | |
|---|---|---|---|---|
| 2009/0051057 | A1* | 2/2009 | Kim ....................... | B01D 65/00 261/121.1 |
| 2009/0201761 | A1 | 8/2009 | Matsuno et al. | |
| 2011/0277379 | A1* | 11/2011 | Bortkevitch .......... | B01F 3/0807 44/457 |

FOREIGN PATENT DOCUMENTS

| | | |
|---|---|---|
| JP | 2000-325767 | 11/2000 |
| JP | 2002-018253 | 1/2002 |
| JP | 2002-045667 | 2/2002 |
| JP | 2006-181449 | 7/2006 |
| JP | 2007-38067 | 2/2007 |
| JP | 2008-030002 | 2/2008 |
| JP | 2008-264771 | 11/2008 |
| JP | 2009-144701 | 7/2009 |
| JP | 2009-274045 | 11/2009 |
| JP | 2010-274254 | 12/2010 |
| JP | 2011-117322 | 6/2011 |
| JP | 2012-236151 | 12/2012 |
| WO | 2011/121631 | 10/2011 |

* cited by examiner

Cross sectional view taken along line 6'-6'

Enlarged view of a circled area shown in *FIG. 8*

Enlarged view of a circled area shown in *FIG. 12*

METHOD, A BUBBLE GENERATING NOZZLE, AND AN APPARATUS FOR GENERATING MICRO-NANO BUBBLES

TECHNICAL FIELD

The present invention relates to a method for, a bubble generating nozzle for, and an apparatus for generating micro-nano bubbles, wherein the method, the nozzle, and the apparatus use water hammering.

BACKGROUND OF THE INVENTION

Washing or sterilizing by micro-nano bubbles is a method that uses only water, air, and additives of a trace quantity, offering a reduced environmental load. Due to this, such method has attracted attention as an alternative to a conventional method for washing or sterilizing that uses materials like detergents and chemicals. In addition, because of such method being highly safe, an application as a sterilization method for vegetables and foods has been studied. Conventional methods for generating micro-nano bubbles have been known in three fashions: the gas-liquid two-phase swirl flow method, the venturi tube method, and the pressure dissolution method. (For example, refer to Patent Literatures 1 and 2 for the gas-liquid two-phase swirl flow method and the pressure dissolution method.)

Such methods are however not satisfactory because the number of micro-nano bubbles generated by each of such methods is still not large enough. Although each of such conventional three methods can easily produce micro-bubble water, nucleating agents like base and magnesium must be added to the micro-nano water for generating a sufficient number of micro-nano bubbles. Addition of the nucleating agents has been a major obstacle in expansion of application to washing and sterilization of such as semiconductor devices and food. At present however, it is very difficult to generate a large amount of micro-nano bubbles using pure water.

Pumps of various types are employable as the driving pump in an apparatus that generates bubbles using water, air, and additives of a trace quantity. However, washing and sterilization of semiconductor devices and foods require that all the pertinent apparatus components including the driving pump should operate without causing metal contamination. For example, when devices such as semiconductor wafers are to be washed without metal contamination, all the wetted parts of pumps to be used in an apparatus for generating micro-nano bubbles should be made of those which do not generate any metal ions; and further, such pumps must operate stably at a discharge pressure of 0.3 to 0.6 MPa.

In consideration for these, the inventors of the present invention have proposed an apparatus that employs a compressed-air driven bellows-cylinder pump as a pump that feeds liquid without using rotating movements (Patent Literatures 3 and 4). All the wetted parts of the proposed pump are made of fluorine resin to avoid the feared metal contamination that will occur in a rotating type pump. To achieve the goal of performing a clean washing without the influence of contamination, technical development is desired on application of plastic by use of such as fluorine resin to all the related constituent units for generating micro-bubbles, including not only pumps but also nozzles.

{Patent Literature 1}
Laid-open patent application TOKKAI 2009-274045
{Patent Literature 2}
Laid-open patent application TOKKAI 2008-264771
{Patent Literature 3}
U.S. Pat. No. 4,547,451
{Patent Literature 4}
U.S. Pat. No. 4,924,907

SUMMARY OF THE INVENTION

In conventional technologies, it is extremely difficult to generate a large amount of micro-nano bubbles only with pure water but without using any nucleating agents. Granted that addition of the nucleating agents is intended, the agents are required to be used in a significantly reduced amount. In addition, if micro-nano bubbles can be generated in an amount considerably larger than a quantity that conventional technologies will generate, great improvement in washing and sterilization can be expected and, further, the broadening of application of such technique to various usages becomes practicable. Thus, a method for generating micro-nano bubbles by a new technique instead of prior techniques and an apparatus for generating micro-nano bubbles capable of actualizing such new technique have been strongly desired.

In the technical field to which the present invention relates, constructing a system capable of generating micro-nano bubbles without metal contamination is still being sought as in the past. As stated above, a prospect that this problem can be solved by employing a compressed-air driven bellows-cylinder pump, in which all the wetted parts thereof are made of fluorine resin, is obtained. Moreover, if micro-nano bubbles can be generated in an amount considerably larger than a conventional quantity using a micro-nano bubble generating apparatus that employs the pump of such configuration, it is expected that such bubble-generating method will be a useful washing method as a response to a demand by technical movements toward the fining of wiring in manufacturing semiconductor devices. At present however, a high performance apparatus of metal-free material that can generate an increased amount of bubbles has not been available.

Therefore, it is strongly desired to establish a new method for generating micro-nano bubbles and to develop a high-performance apparatus for generating micro-nano bubbles, by general optimization of structures and shapes of constituents including pumps and other constituting parts such as a bubble generating nozzle, a gas-liquid mixing vessel, and a liquid-feeding device. Ultimately, it is necessary to construct a system capable of generating micro-nano bubbles without metal contamination.

In view of the background described above, an object of the present invention is to provide an apparatus for generating micro-nano bubbles to construct a system that performs clean washing and sterilizing with a large amount of micro-nano bubbles generated using pure water only and can generate micro-nano bubbles without metal contamination. The apparatus intended to be provided, including a bubble generating nozzle and an auto-regulating gas-liquid mixing vessel is to operate on a new method, which is different from conventional arts, for generating micro-nano bubbles using water hammering.

The basic idea for solving the problem described above is use of violent water hammering to generate a large amount of micro-nano bubbles that contains dissolved gas, wherein the water hammering occurs in collision of water, a non-compressive substance. To actualize this, the inventors of the present invention has been led to the present art through, in the method for generating micro-nano bubbles and the apparatus therefor, optimizing the structure and the shape of the bubble generating nozzle so that the water hammering power will work to its utmost extent and constructing an apparatus for generating micro-nano bubbles having a configuration that accelerates generating a large amount of micro-nano bubbles.

Thus, the configuration of the present invention is as follows:

(2) The present invention provides a method for generating micro-nano bubbles using water hammering power, the method comprising:

producing jets of a gas-including liquid by injecting the liquid from the outside of a cylinder via two or more through-holes in the cylinder at a pressure higher than the atmospheric pressure, providing the cylinder having such two or more through-holes with a diameter of 0.1 to 6.0 mm, arrayed in the circumferential direction thereof with such a configuration that the respective openings of such two or more small through-holes are arranged facing each other in the same plane;

creating a collision of the jets of the gas-including liquid inside the cylinder; and generating micro-nano bubbles by the mutual collision of the jets of the gas-including liquid, wherein, in order to maintain the inflow direction of the gas-including liquid unchanged until reaching the inlet position of the through holes, the cylinder is arranged perpendicular to an inflow direction of the gas-including liquid so as to align the openings of the through-holes with the inflow direction thereof, or arranged in parallel to the inflow direction of the gas-including liquid using a cylinder which has one end formed into a closed tube-like shape and an outer wall with a smaller cross-sectional area than that of an introduction port of the gas-including liquid, provided inside a nozzle case for feeding the gas-including liquid to the cylinder.

(3) The present invention provides the method for generating micro-nano bubbles as described in the paragraph (2), further comprising:

a sucking process that sucks a gas and a liquid;

a pressurization process that pressurizes the gas and the liquid;

a dissolved gas enriching process, wherein the pressurized gas-including liquid is mixed with another new gas;

a dissolved gas miniaturization process that generates micro-nano bubbles, wherein the pressurized gas-including liquid prepared at the dissolved gas enriching process is injected from the outside of the cylinder having two or more through-holes with the diameter of 0.1 to 6.0 mm, arrayed in the circumferential direction thereof with such a configuration that the respective openings of such two or more through-holes are arranged facing each other in the same plane via such through-holes at a pressure higher than the atmospheric pressure to produce jets of the liquid, and the jets are collided mutually inside the cylinder.

(4) The present invention provides the method for generating micro-nano bubbles as described in the paragraph (2), wherein the pressure higher than the atmospheric pressure at the time of squirting is between 0.2 and 0.6 MPa, and the diameter of the small through-holes at the part leading to the hollow of the cylinder is between 0.1 and 0.3 mm.

(5) The present invention provides the method for generating micro-nano bubbles as described in the paragraph (2), wherein the liquid of the gas-including liquid comprises at least one substance selected from the group consisting of ozone, oxygen, hydrogen peroxide, chloric acid, perchloric acid, and potassium permanganate.

(6) The present invention provides the method for generating micro-nano bubbles as described in the paragraph (2), wherein the gas of the gas-including liquid comprises at least one substance selected from the group consisting of carbon dioxide, hydrogen gas, and nitrogen gas.

(7) The present invention provides an apparatus for generating micro-nano bubbles using water hammering power created by a mutual collision of jets of a gas-including liquid, comprising:

a gas port, a liquid pipe and a regulating valve for sucking each of a gas and a liquid;

a pump for pressurizing the gas and the liquid in a mixture and transferring them;

a gas-liquid mixing vessel for enriching the dissolved gas by mixing the transferred liquid, which includes the gas, with another new gas; and a bubble generating nozzle for generating micro-nano bubbles using the gas-including liquid prepared in the gas-liquid mixing vessel, wherein the bubble generating nozzle comprises:

a hollow cylinder having two or more through-holes with a diameter of 0.1 to 6.0 mm, arrayed in the circumferential direction thereof with such a configuration that the respective openings of each of such two or more through-holes faces each other in the same plane; and a micro-nano bubble discharge port provided on at least one end of the hollow cylinder, wherein the through-holes are arranged so that all of their extension lines passing through respective center of the cross-section of each of the through-holes intersect each other in the inside of the hollow of the cylinder, wherein, in order to maintain the inflow direction of the gas-including liquid unchanged until reaching the inlet position of the through-holes, the hollow cylinder is arranged perpendicular to an inflow direction of the gas-including liquid so as to align the openings of the through-holes with the inflow direction thereof, or arranged in parallel to the inflow direction of the gas-including liquid using a cylinder which has one end formed into a closed tube-like shape and an outer wall with a smaller cross-sectional area than that of an introduction port of the gas-including liquid, provided inside a nozzle case for feeding the gas-including liquid to the cylinder.

(8) The present invention provides the apparatus for generating micro-nano bubbles as described in the paragraph (7), wherein the bubble generating nozzle has two or more numbers of hollow cylinders.

(10) The present invention provides the apparatus for generating micro-nano bubbles as described in the paragraph (7), wherein the hollow cylinder has, in its longitudinal direction, two or more rows of the through-holes, each of such rows consisting of two or more through-holes with a diameter of 0.1 to 6.0 mm.

(11) The present invention provides the apparatus for generating micro-nano bubbles as described the paragraph (7), wherein the diameter of the through-holes that lead to the hollow of the hollow cylinder is between 0.1 and 0.3 mm.

(12) The present invention provides the apparatus for generating micro-nano bubbles as described in the paragraph (7), wherein the diameter of the micro-nano bubble discharge port provided on at least one end of the hollow cylinder is equal to or larger than the diameter of a part of the hollow cylinder, wherein such part is such a part where the through-holes are arranged in a circumferential direction.

(14) The present invention provides the apparatus for generating micro-nano bubbles as described in the paragraph (7), wherein, in the bubble generating nozzle for generating micro-nano bubbles, the gas-including liquid is squirted at a pressure of 0.2 to 0.6 MPa through the through-holes of the bubble generating nozzle.

(15) The present invention provides the apparatus for generating micro-nano bubbles as described in the paragraph (7), wherein the gas-liquid mixing vessel has the bubble generating nozzle for generating micro-nano bubbles, and the liquid that includes the gas transferred by the means for pressurizing and transferring is discharged into the gas-liquid mixing vessel by the bubble generating nozzle.

(16) The present invention provides the apparatus for generating micro-nano bubbles as described in the paragraph (7), wherein the gas-liquid mixing vessel has a float valve inside or outside the vessel to maintain the volume of the gas and the liquid and the internal pressure inside the vessel always within a prescribed range by discharging excess gas from the vessel.

(17) The present invention provides the apparatus for generating micro-nano bubbles as described in the paragraph (7), wherein a pump or piping, or both, through which the gas-including liquid flows, is made of plastic.

(18) The present invention provides the apparatus for generating micro-nano bubbles as described in the paragraph (17), wherein a pump or piping, or both, through which the gas-including liquid flows, is made of fluorine resin.

(19) The present invention provides the apparatus for generating micro-nano bubbles as described in the paragraph (7), wherein the pump for pressurizing and transferring the liquid that includes the gas is a compressed-air driven or an electric motor driven bellows cylinder pump.

(20) The present invention provides the apparatus for generating micro-nano bubbles as described in the paragraph (7), wherein the liquid of the gas-including liquid comprises at least one substance selected from the group consisting of ozone, oxygen, hydrogen peroxide, chloric acid, perchloric acid, and potassium permanganate.

(21) The present invention provides the apparatus for generating micro-nano bubbles as described in the paragraph (7), wherein the gas of the gas-including liquid comprises at least one substance selected from the group consisting of carbon dioxide, hydrogen gas, and nitrogen gas.

(22) The present invention provides the apparatus for generating micro-nano bubbles according to the paragraph (20), wherein the gas of the gas-including liquid additionally comprises at least one substance selected from the group consisting of carbon dioxide, hydrogen gas, and nitrogen gas.

The method for generating micro-nano bubbles by the present invention generates micro-nano bubbles using the water hammering power. Therefore, the method is able to generate micro-nano bubbles in a large amount using pure water only without use of substances which are not necessarily needed such as nucleating agents. Accordingly, the method can realize a clean washing and sterilization. Since this water hammering power is maximized by the use of a bubble-generating nozzle having an optimized structure and shape, the use of such optimized nozzle makes it possible to perform the continuous and stable generation of bubbles in an efficient manner. Thereby, the amount of generation of small-size bubbles, not only of the size of micrometer order but also of nanometer order, can be increased together. This feature enhances the capability and function in the washing and sterilizing more than those in conventional techniques.

The apparatus for generating micro-nano bubbles by the present invention has a bubble generating nozzle and equipment configuration that permits the generating of bubbles in a large amount stably; therefore, the apparatus is usable in a set of equipment for clean washing and sterilizing with pure water.

On the other hand in the gas-liquid mixing vessel that dissolves gas in liquid, transferring a gas and a liquid in a mixture by a pump may sometimes prevent generating uniform micro-nano bubbles. This is because the occurrence of a phenomenon in which the volume of the gas increases, causes the inside of the gas-liquid mixture vessel to become full of the gas and the volume of the liquid in the vessel to be lessened, and the gas not dissolved in liquid is fed to the bubble generating nozzle in an as-gas-state, resulting in an unstable generation of micro-nano bubbles. This problem is solvable by discharging an excess gas from the gas-liquid mixing vessel through a float valve provided inside or outside the vessel. With this float valve, the volume of the gas and the liquid are always maintained within a prescribed range and thereby the amount of generation of the micro-nano bubbles becomes constant.

Further, for a clean washing that is incompatible with metal ions which a wetted part generates, configuring a pump or piping, or both, in a washing apparatus with plastic or preferably with fluorine resin makes the apparatus become to have a high reliability and a clean feature.

The method and the apparatus by the present invention contribute to constructing a micro-nano bubble generating system that generates bubbles without metal contamination. For example, application of the present invention to washing such as semiconductor wafers simplifies such washing process compared to conventional processes that perform complicated washing using such as drug solutions. Further, the invention is cable of reducing an environmental load because the invented method does not need use of materials such as drug solutions. Moreover, the use of the invention for sterilization of foods such as vegetables makes it possible to perform reliable and safe sterilization.

DETAILED DESCRIPTION OF THE PREFERRED EMBODIMENTS

The following describes the best mode for carrying out the present invention, referring to drawings.

Figure 1:
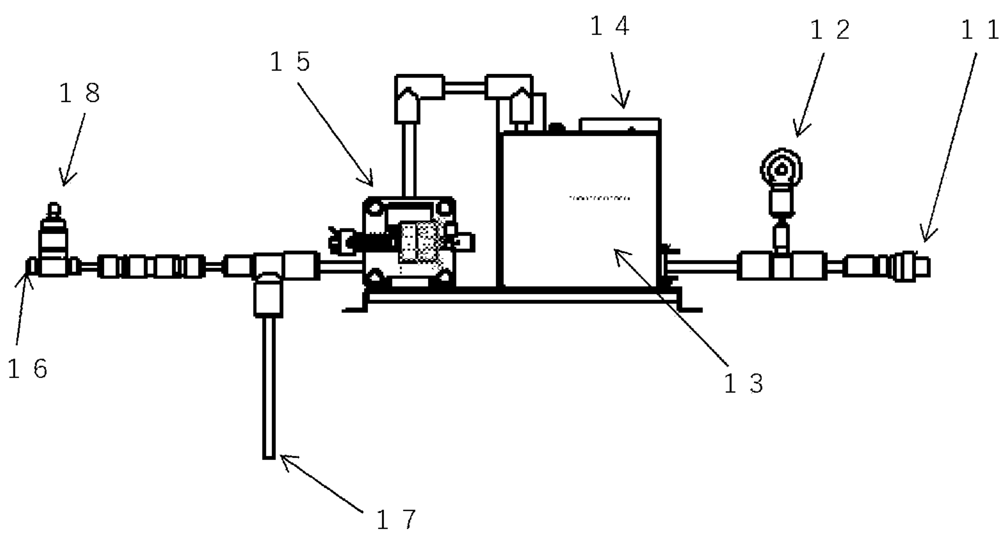
FIG. 1 is a front view of a micro-nano bubble generation system to which the present invention is applied.
Figure 2:
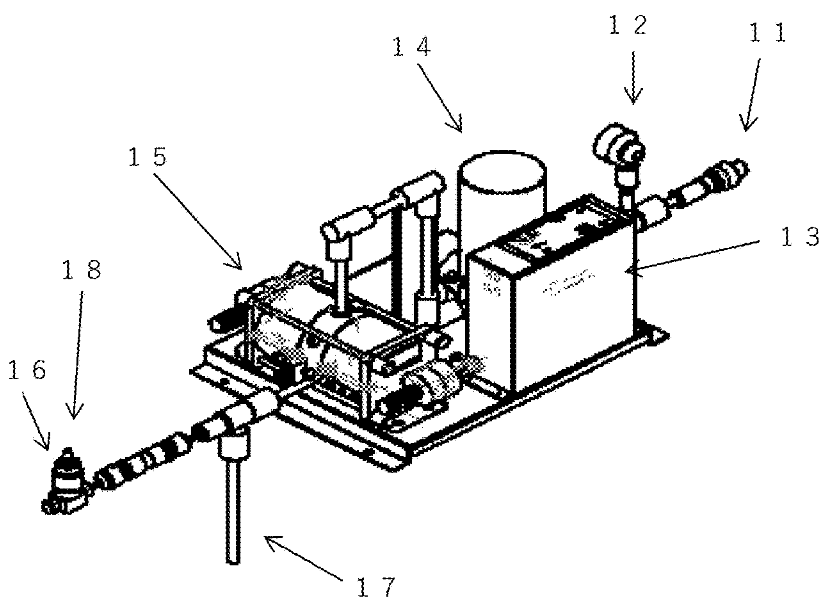
FIG. 2 is a perspective view of the micro-nano bubble generation system to which the present invention is applied.

FIG. 1 is a front view of the micro-nano bubble generating system to which the present invention is applied and FIG. 2 is a perspective view of the same. Each of the reference numerals therein denotes;

15: a bellows cylinder pump,

13: a pump controller,

14: a gas-liquid mixing vessel,

12: a pressure sensor,

11: a micro-nano bubble generating nozzle attachment part,

17: a liquid sucking pipe,

16: a gas sucking port, and

18: a gas sucking regulating valve.

These constituents are arranged as illustrated in a perspective view FIG. 2. The bellows cylinder pump 15, wetted parts of which are made of fluorine resin, sucks a gas and a liquid into the pump in a mixture state through the liquid sucking pipe 17 and the gas sucking regulating valve 18, with the volume of the gas regulated. The sucked liquid and gas mixture is agitated and compressed inside the bellows to dissolve the gas in the liquid. In the present invention, if the bellows cylinder pump 15 has a metal free structure, such configuration is enough. Any plastic other than fluorine resin can also be usable. The usable plastic includes at least one of plastics selected from the group consisting of, for example: general purpose plastics such as polyethylene, polypropylene, and polyethylene terephthalate; engineering plastics such as polyacetar, polyamide, polycarbonate, and denaturing polyphenylene ether; and super engineering plastics such as polyether sulfone, polyphenylene sulfide, polyether ether ketone, and liquid crystal polymer. When the use of plastic is intended, applying above stated various plastics including fluorine resin to the wetted part, not only to the pump only, will provide an apparatus for generating micro-nano bubbles having a high reliability and cleanliness. In addition to the above, when washing or sterilizing in a strict metal free condition is not required, metals and ceramics may be used as well as those plastics mentioned above.

Next, the gas and the liquid are agitated by the pump 15 and are force-fed to the gas-liquid mixing vessel 14. The pump 15 used is mainly a bellows cylinder pump of compressed-air driven type but an electric motor driven type may be used. The gas and the liquid in the gas-liquid mixing vessel 14 are under the pressure generated by the pump 15; therefore, the gas is easily dissolved. The pressure that force-feeds the gas and the liquid from the pump 15 is watched by the pressure sensor 12. Increasing the quantity of the dissolved gas with this manner, the preparations are made for increasing the amount of generation of the micro-nano bubbles. In the micro-nano bubble generating system by the present invention, it is a practical manner to use the bellows cylinder pump as the pump 15. Depending on the use purpose however, conventionally known pumps are applicable. The applicable pumps include a reciprocating pump such as a piston pump, a plunger pump, or a diaphragm pump; or a rotary pump such as a gear pump, an eccentric pump, or a screw pump.

The liquid entered under force-feeding into the gas-liquid mixing vessel 14 mixes with a gas to dissolve the gas thereinto and then is transferred to the micro-nano bubble generating nozzle attachment part 11. The micro-nano bubble generating nozzle attachment part 11 is a part to which a nozzle connects, wherein the nozzle generates, from the gas-including liquid, micro-nano bubbles in a large amount having a diameter of 60 μm or smaller, preferably to be 15 μm or smaller.

At that time, the pressure sensor 12 senses variations of the liquid pressure at the section between the micro-nano bubble generating nozzle attachment part 11 and the gas-liquid mixing vessel 14 to watch the dissolving conditions of the gas-liquid mixture. By this, a constant pressure condition needed for stable generation of micro-nano bubbles is actualized.

The process to be performed by the apparatus for generating micro-nano bubbles to which the present invention is applied is as follows. Treatments that the gas sucking port 16, the liquid sucking pipe 17, and the gas sucking regulating valve 18 perform are the gas- and liquid-sucking process. The pressure is regulated by the pressure sensor 12. Next, the gas-including liquid is pressurized using the bellows cylinder pump 15; this treatment is the gas-liquid pressurization process. Following this process, the pressurized gas-including liquid is mixed with another new gas using the pump controller 13 and the gas-liquid mixing vessel 14; this treatment is the dissolved gas enriching process. After this, the bubble generating nozzle by the present invention, which nozzle will be mentioned later, is connected to the micro-nano bubble generating nozzle attachment part 11 to generate micro-nano bubbles. This process is referred to as the dissolved liquid miniaturization process, in which the micro-nano bubbles are generated by injecting the gas-including liquid from the outside of a cylinder, which has two or more small through-holes, via such small through-holes at a pressure higher than the atmospheric pressure to produce jets of the liquid, and the jets are collided mutually at one point inside the cylinder.

Figure 3:
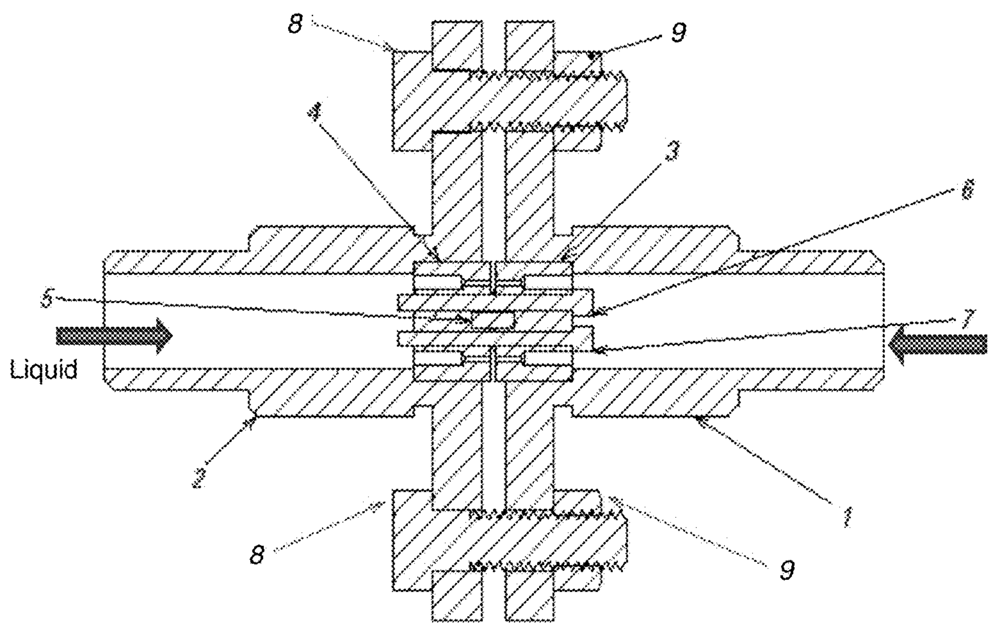
FIG. 3 is a cross sectional view of a micro-nano bubble generating nozzle.

Next, explanation follows to describe a method for generating micro-nano bubbles in a large amount from the gas-including liquid that is in a gas-dissolved state. FIG. 3 is a cross sectional view of the micro-nano bubble generating nozzle including an attachment part. In the figure, reference numerals 1 and 2 are the outer cases of the nozzle, which are disposed facing each other and fastened together using a bolt 8 and a nut 9, wherein the gas-including liquid force-fed by the pump is divided into two streams and each of the streams is separately introduced into the outer cases 1 and 2 as arrows show. In each of the outer cases so disposed, a recess is provided to accommodate the high-speed liquid jet squirting nozzle parts 3 and 4. The size of the nozzle hole determines the flow rate and the flow velocity of the liquid discharge.

Figure 4:
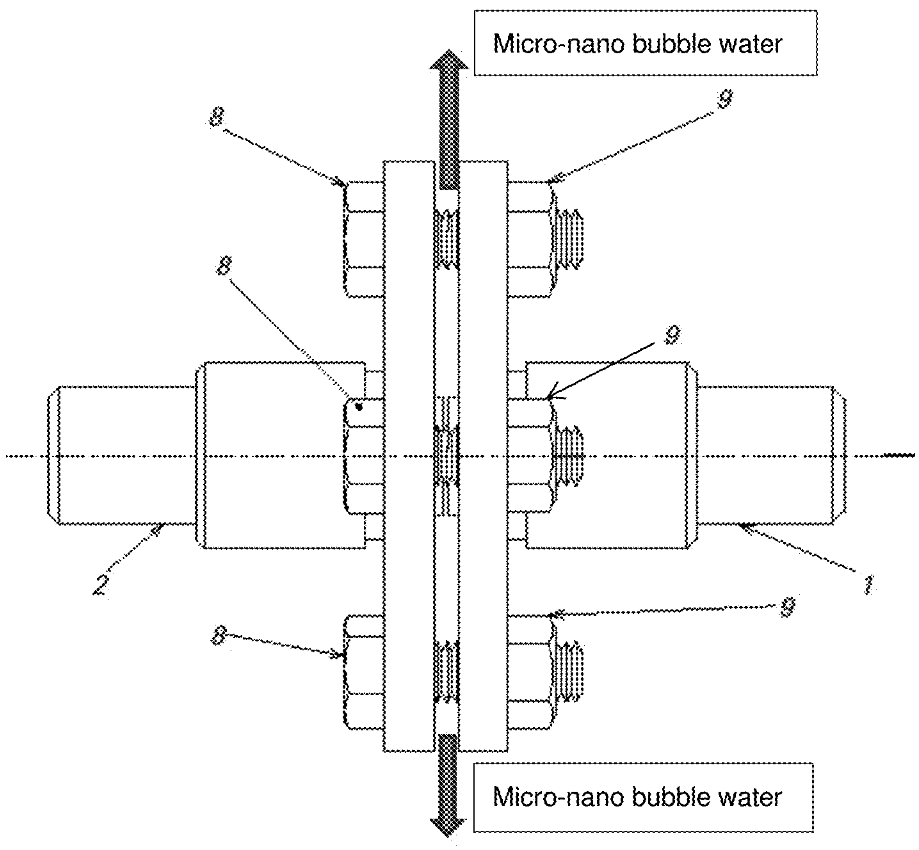
FIG. 4 is a front view of the micro-nano bubble generating nozzle.
Figure 5:
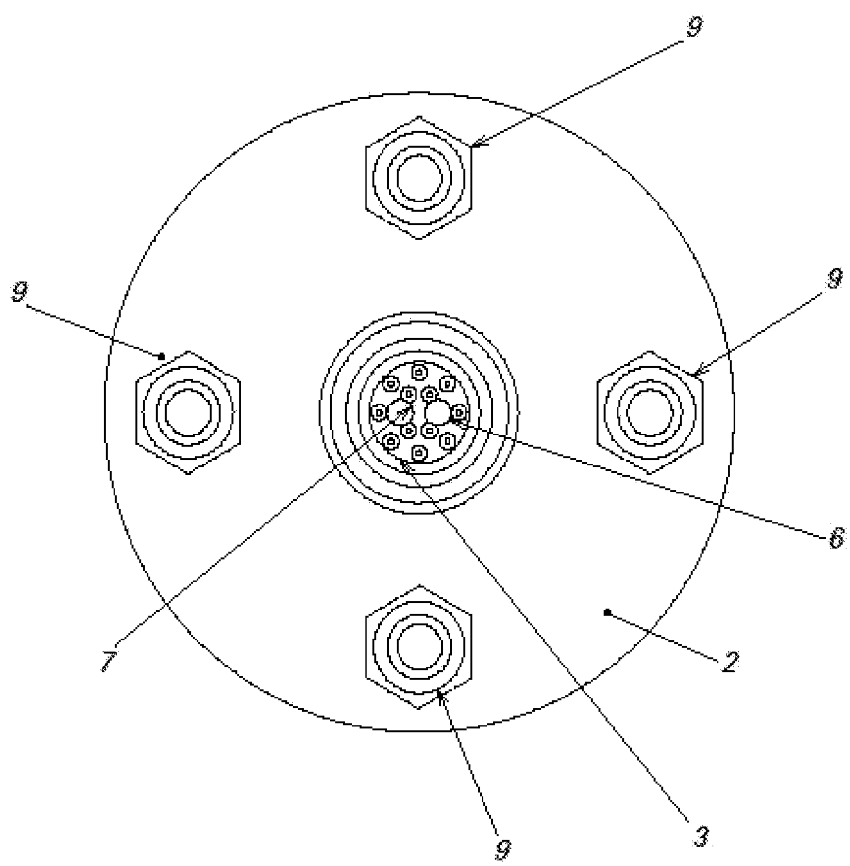
FIG. 5 is a side view of the micro-nano bubble generating nozzle.

FIG. 4 illustrates the nozzle in the fabricated state, in which the bolt 8 is tightening-fastened by the nut 9. The water that produced micro-nano bubble is discharged in the radial direction indicated by arrows. FIG. 5 is a side view of the micro-nano bubble generating nozzle by high-speed liquid jet squirting, in which the micro-nano bubble water is discharged in the circumferential direction.

The following explains how to generate the micro-nano bubbles using the water stream squirted from the high-speed liquid jet squirting nozzle. The gas-including liquid is discharged from the high-speed liquid jet squirting nozzle at the discharge pressure of 0.2 MPa to 0.6 MPa given by the high-pressure pump 15. The discharged liquid rapidly releases its pressure and collides violently each other producing a water hammering power. The explosive water hammering smashes the gas-including liquid and makes the liquid to be in a state that a large amount of micro-nano bubbles is involved therein. It should be noted that, depending on the method of release, there is a case where the amount of generation of micro-nano bubbles becomes reduced. However, the micro-nano bubbles can be generated in a large amount with the method and the apparatus by the present invention.

Figure 6:
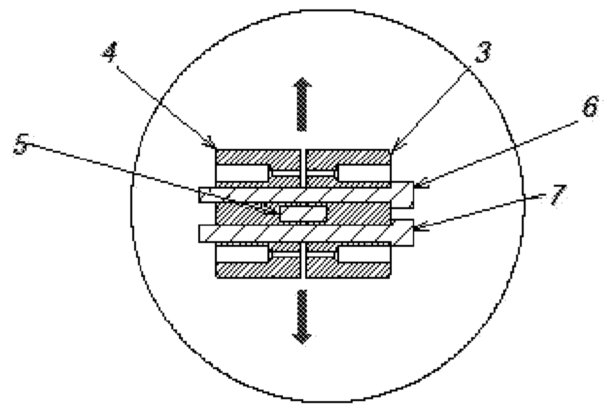
FIG. 6 illustrates a high-speed jet liquid squirting nozzle part.
Figure 6:
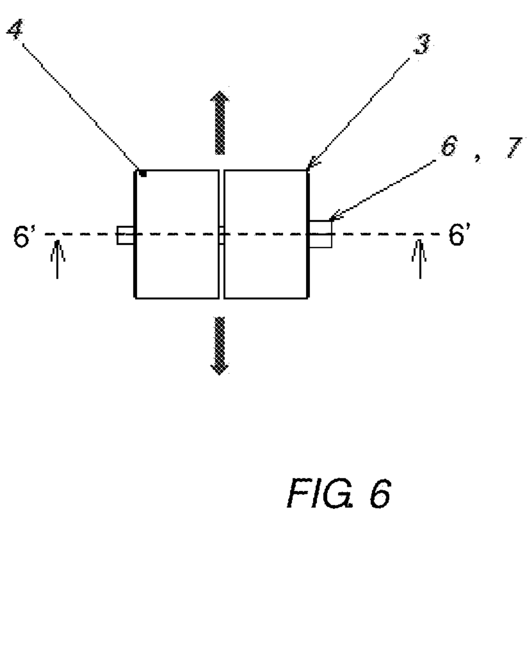

FIG. 6 is a cross sectional view taken along the line 6'-6' and an outline view of the high-speed liquid jet squirting nozzle parts 3 and 4 that generate micro-nano bubbles. The high-speed liquid jet squirting nozzle parts 3 and 4 are, as illustrated in the cross sectional view, centered relying on the centering pin 5, which defines the center, and positioned guided by the positioning pins 6 and 7, and then fixed. The high-speed liquid jet squirting nozzle parts 3 and 4 generate the micro-nano bubbles.

Figure 7:
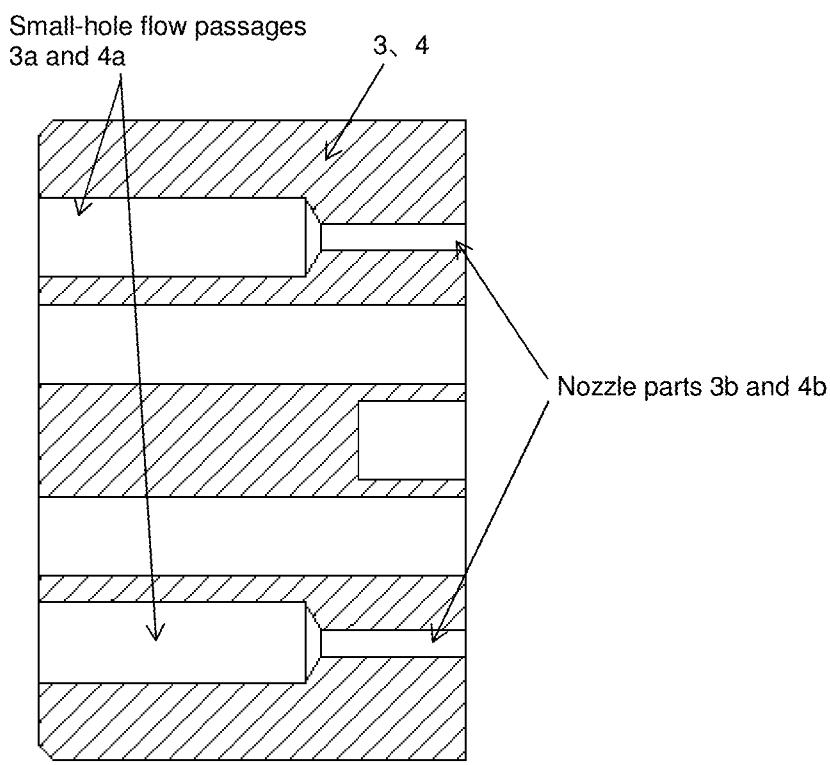
FIG. 7 is an enlarged partial cross sectional view of the high-speed jet liquid squirting nozzle part.

FIG. 7 is an enlarged cross sectional view of the high-speed liquid jet squirting nozzle parts 3 and 4 illustrated in FIG. 6. Since these parts 3 and 4 have the same shape and disposed symmetrically, the following explains using reference numerals 3 and 4 for simplicity. To feed the gas-including liquid to 3 and 4 in high-speed jets, the liquid stream is narrowed at small-hole flow passages 3*a* and 4*a*. Thereby the jet stream squirts from the end of small-hole flow passages 3*a* and 4*a* that narrow the liquid stream. Nozzle parts 3*b* and 4*b* are arranged so that the jets squirted from each of the high-speed liquid jet squirting nozzle parts 3 and 4 collide, producing micro-nano bubbles from the collided gas-including liquid. The micro-nano bubbles that involve the gas inside diffuse in the circumferential direction indicated by arrows.

The reason of feeding the liquid at a high-pressure is to increase the speed of the liquid in squirting from the small-hole. This means that making the liquid collision high-speed increases the impact energy and that a large amount of micro-nano bubbles of more minute size can be generated thereby.

Assume that F is the power of collision. Also assume that the density of a liquid is ρ, the size of a small-hole S, and the velocity of a liquid V. Then, the relationship of $F=\rho SV^2$ holds. For the optimal value of F, the optimum design that considers the relation between the size of hole S and the velocity V is needed.

What is important here is that, if a pump capable of generating a higher pressure is used, there is a possibility that a further-large amount of micro-nano bubbles can be generated. For example, it is available to use a high-pressure pump that generates pressures of 0.5 to 250 MPa or so. If a pump of this kind is used, the liquid velocity V increases proportionally to the pressure and the amount of generation of micro-nano bubbles greatly increases because the impact power of the water hammering power F increases with the square of V. However, for the application of such high-pressure pump to an apparatus for generating micro-nano bubbles, it is difficult to meet various demands such as light weight, small size, metal-free, and low maintenance cost.

In the present invention, by using the nozzle having a structure as illustrated in FIGS. 3 to 7, the amount of generation of micro-nano bubbles can be made equal to or more than the conventional quantity when the pressure of squirting the liquid of the gas-liquid mixing state is the atmospheric pressure (about 0.1 MPa) or more. Further, setting the pressure to 0.2 MPa or higher makes it possible to generate micro-nano bubbles in an amount sufficient for performing clean washing and sterilizing. As mentioned above in the present invention, the lower limit of the squirting pressure of the dissolved liquid can be set to 0.2 MPa, a lower value than the conventional pressure. It therefore becomes practicable to use a pump suitable for eliminating metal contamination, that is, the compressed-air driven or electric-motor driven bellows cylinder pump 15 made of fluorine resin, as shown in FIGS. 1 and 2. On the other hand, if the squirting pressure of the dissolved liquid exceeds 0.6 MPa while using the compressed-air driven or electric-motor driven bellows cylinder pump of the present invention, the amount of generation of micro-nano bubbles tends to be saturated. Therefore, the squirting pressure of the dissolved liquid in the present invention is preferred to be 0.2 to 0.6 MPa.

The micro-nano bubble generating nozzle by the present invention needs to have a diameter of 0.1 to 6 mm at its nozzle parts 3*b* and 4*b* shown in FIG. 7 so as to squirt the jet of the gas-including liquid in a pressure higher than the atmospheric pressure, preferably 0.2 to 0.6 MPa, which are lower than conventional pressures. Here, the openings of the nozzle parts 3*b* and 4*b*, from which the jet stream squirts, and the diameters of the nozzle parts 3*b* and 4*b* correspond to the "spouts" and the "diameters of the small through-holes of the nozzle leading to the hollow of the cylinder" respectively, as the present invention defines. The reason for specifying the diameter of the nozzle parts 3*b* and 4*b* to be between 0.1 and 6 mm will be detailed in the description of an embodiment example later.

The small-hole flow passages 3*a* and 4*a* are enough when they are such a device as has a stream-narrowing function for feeding the gas-including liquid in a form of a high-speed jet; and when they are taper-shaped continuously toward the nozzle parts 3*b* and 4*b*, they may also be enough. The amount of generation of micro-nano bubbles is determined mainly by the dimension of the diameter of the nozzle parts

3*b* and 4*b*; therefore, the small-hole flow passages 3*a* and 4*a* may be omitted in the present invention.

Figure 8:
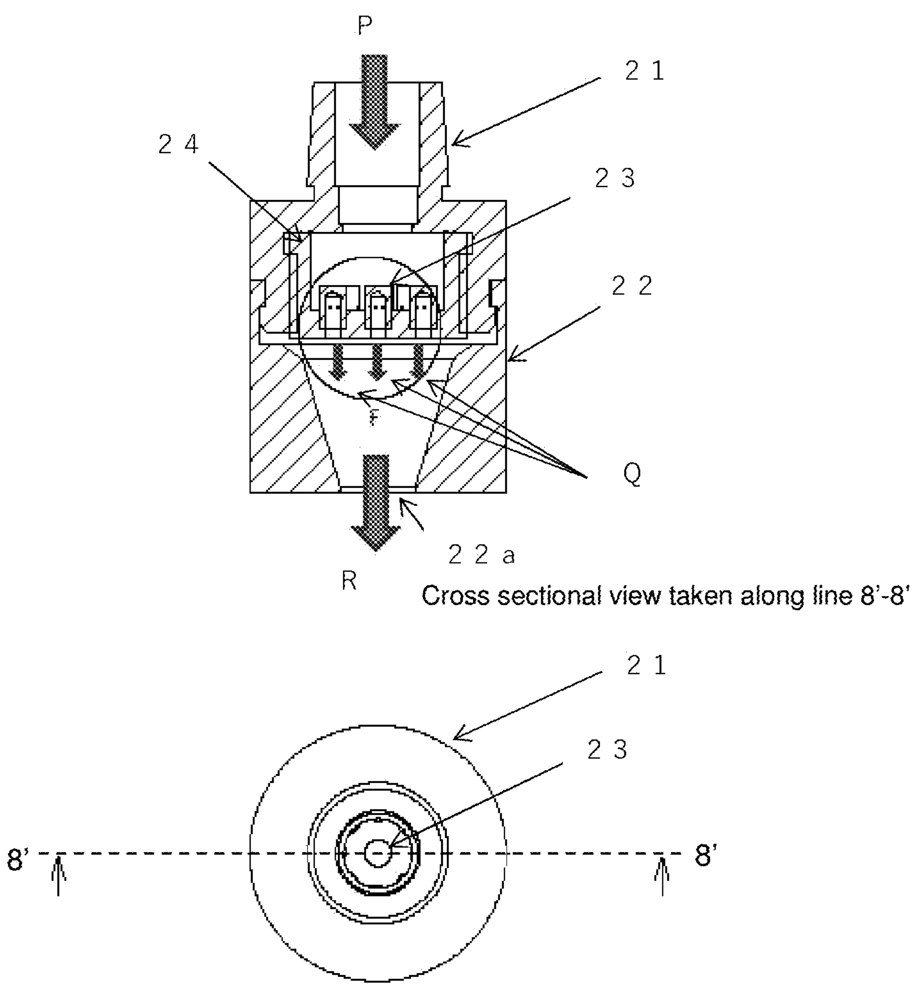
FIG. 8 is a cross sectional view of a nozzle that generates micro-nano bubbles.

An example of another method for colliding the gas-dissolved liquid will be explained referring to FIG. 8 showing a cross-section along a line 8'-8'. Illustrated in FIG. 8 is the nozzle for generating micro-nano bubbles, which is comprised of a nozzle case 21, a micro-nano bubble discharging nozzle 22, and a base 24, wherein one or more liquid-collision nozzles 23 are installed on the base 24.

Figure 9:
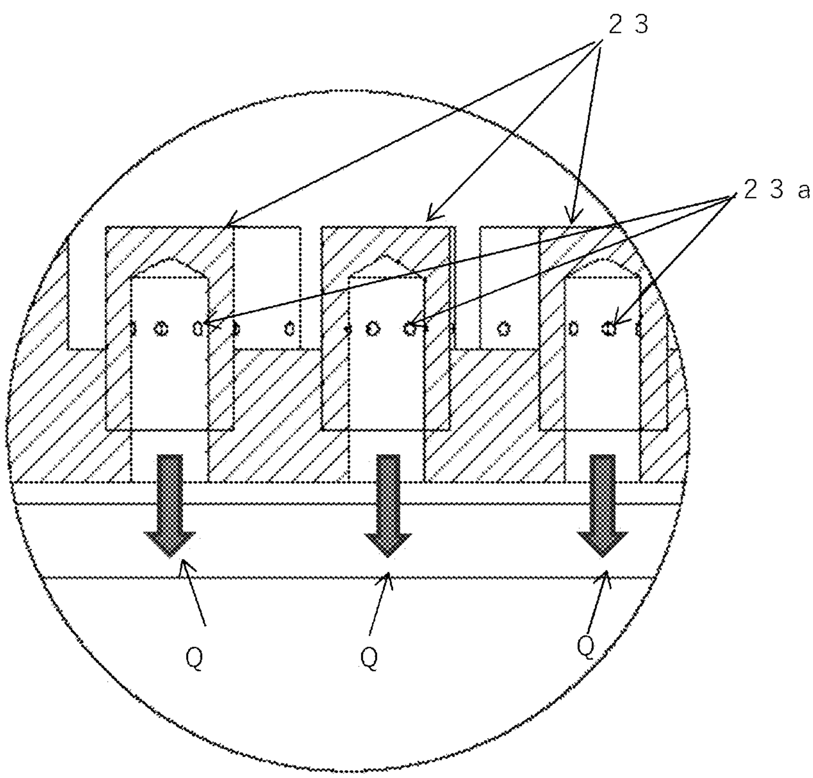
FIG. 9 is a cross sectional detail view of a liquid-collision nozzle with which micro-nano bubbles are generated.
Figure 10:
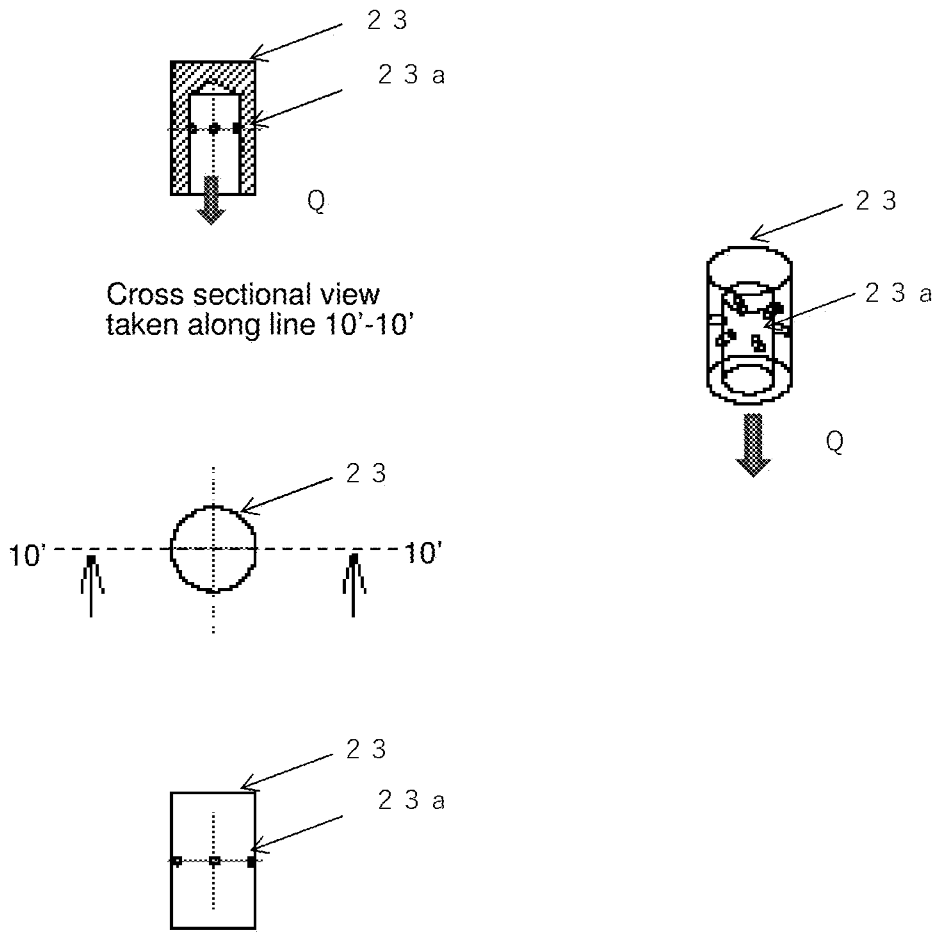
FIG. 10 is a front view, a cross sectional view, and a three-dimensional view of the liquid-collision nozzle.

FIG. 9 is an enlarged view of the part where the liquid-collision nozzle 23 shown in FIG. 8 is disposed. FIG. 10 showing a cross-section along a line 10'-10', illustrates the shape of a single piece of the liquid-collision nozzle 23. A small-hole 23*a* opens toward the center of the liquid-collision nozzle 23. High-pressure liquid entering through this small-hole at a high-pressure in the direction of the arrow Q collides in the center of the liquid-collision nozzle 23, generating micro-nano bubbles.

The experiment told that controlling the velocity of liquid V made the amount of generated micro-nano bubbles increased and the life of bubbles prolonged. When the velocity V exceeds 25 m/s as a guideline, the nozzle generates micro-nano bubbles stably.

The same effect will be obtained at a lower liquid velocity by squirting the liquid toward center from every direction concentrating the water hammering at the center. This means that when the water hammering is given from every direction, the same or more effect will be produced even if the velocity is reduced to ½. For example, since $F=2\rho SV^2$, when eight holes are arranged so that the hammering among the jets concentrates in the center, the force at the center becomes $F=\rho S(1/2)^2\times 8=2\rho SV^2$. Thus, when the small-hole of the nozzle is provided in a plural number for concentrating the water hammering produced by the liquid collision, the energy of the liquid collision becomes same even if the velocity V is low because the flowing quantity of liquid increases. Since the amount of generation of micro-nano bubbles will be acceptably same if the energy in the collisions of the liquid is same, the pressure of discharging the liquid can be lowered and the amount of generation of micro-nano bubbles will be secured as desired.

Figure 11:
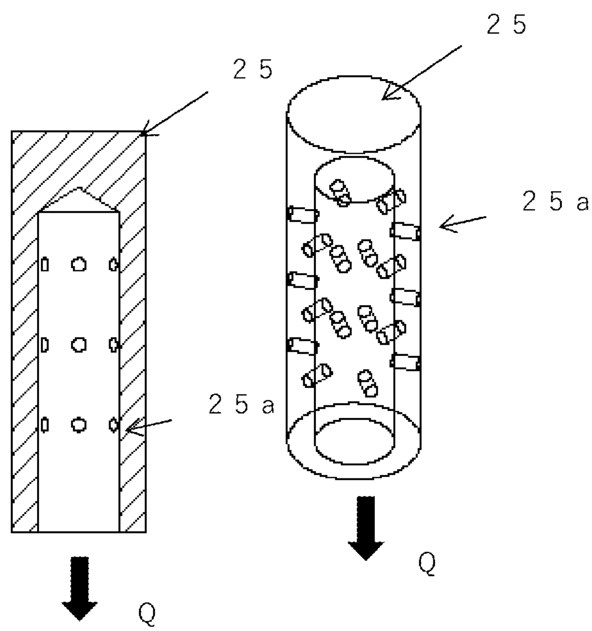
FIG. 11 illustrates a liquid-collision nozzle having multi-row of groups of liquid squirting holes.

FIG. 10 illustrates the shape of the liquid-collision nozzles 23, wherein small-holes 23*a* are made in the circumference of the nozzle-cylinder part of the liquid-collision nozzle 23. Through these small-holes, the gas-including liquid squirts to collide in the center and generates micro-nano bubbles. The micro-nano bubbles thus generated is discharged toward the arrow Q. When a plurality of the liquid-collision nozzles 23 are gather-arrayed, a large amount of micro-nano bubbles are generated and are discharged from a nozzle part 22*a* of the discharging nozzle 22 illustrated in FIG. 8. As illustrated in FIG. 11, the shape of a liquid-collision nozzle 25 is such a shape as has small-holes 25*a* in a multi-row configuration. For example therefore, when three places are provided for producing the water hammering by making holes in a three-row configuration, it becomes practicable to generate micro-nano bubbles in a large amount. Thus, this practice is a useful method for miniaturization and increased efficiency.

Discharging the liquid from a plurality of holes, as the nozzle illustrated in FIG. 11, increases the intensity of the water hammering. Using this technique will not decrease the amount of generation of micro-nano bubbles even if the velocity V is low; and consequently a pump with a high discharging pressure is not needed, which imposes less defrayment. Thus, this technique is industrially very useful and permits development of a nozzle having good efficiency.

Figure 12:
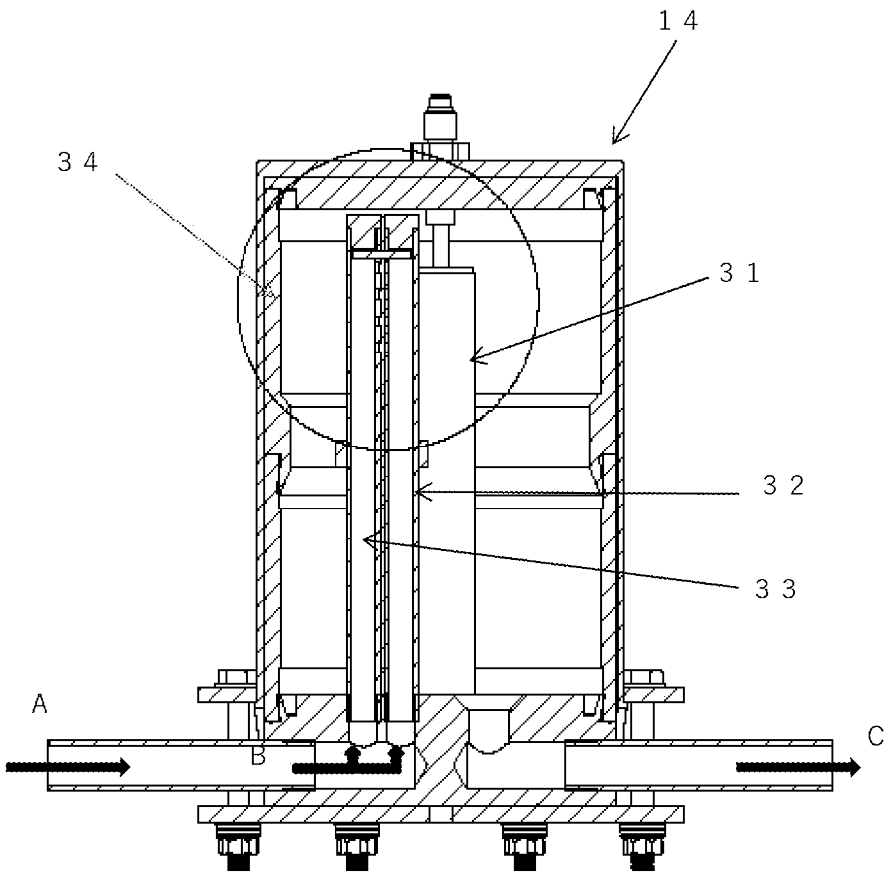
FIG. 12 is a cross sectional view of a gas-liquid mixing vessel.
Figure 13:
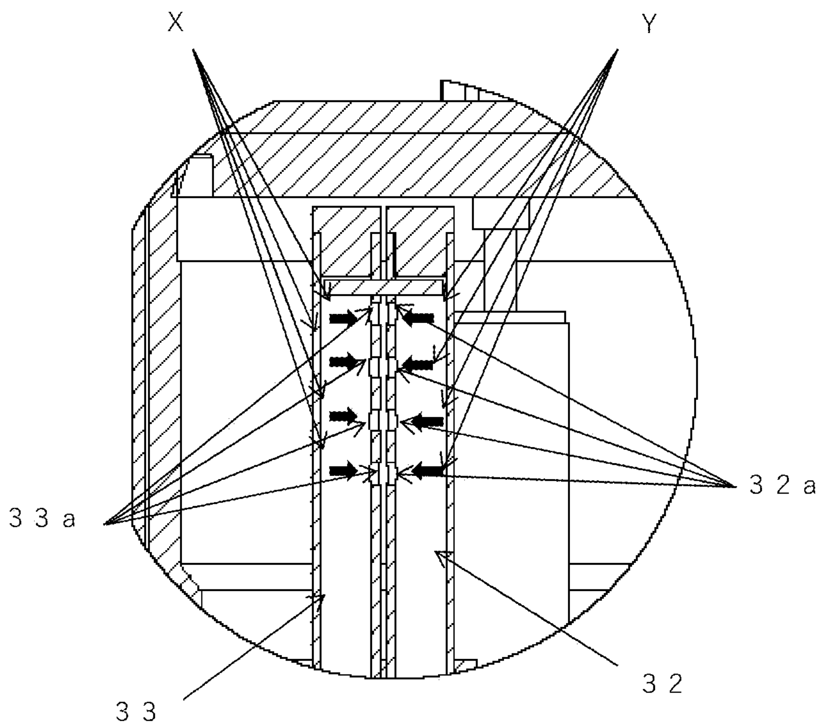
FIG. 13 is a detail view of structure of a high-efficiency gas-liquid injection pipe for mixing gas and liquid in the gas-liquid mixing vessel.

FIG. 12 is a cross sectional view of the gas-liquid mixing vessel 14. FIG. 13 is an enlarged view of the circled area shown in FIG. 12. In a conventional gas-liquid mixing vessel, wherein a gas and a liquid are mixed under a high pressure, the mixture of the gas and pure water is fed into the gas-liquid mixing vessel by a pump and spouted therein upward like a water spout to merge the mixture. This method however is not efficient in mixing; therefore it is necessary to generate micro-nano bubbles in an increased amount for improved efficiency.

Then, as illustrated in FIG. 12, the gas and the liquid are fed by a pump in the direction of the arrow A toward the arrow B and are introduced into gas-liquid injection pipes 32 and 33. And as FIG. 13 illustrates, a water hammering produced by colliding liquid in the directions from the arrow X and the arrow Y is used for increased efficiency of the mixing of a gas and a liquid discharged from a hole of gas-liquid injection pipe 32*a* and a hole of gas-liquid injection pipe 33*a* of the gas-liquid injection pipe 33. Thereby, mixing the gas and the liquid is performed efficiently and the gas-including liquid as a raw material of micro-nano bubbles is produced speedily with an increased merging rate.

A float 31 illustrated in FIG. 12 is provided for the purpose of exhausting excessively entered gas to outside if the gas enters excessively in mixing the gas and the liquid. The float 31 exhausts an entered excess gas safely and regulates the amount of the gas and the liquid to a proper level. This means that a certain situation is produced as described below. If there remains an undissolved gas due to the entering of excessive amount of gas, the gas will flow into the nozzle and impedes the generation of micro-nano bubbles. The float eliminates this adverse effect of impeding bubble generation and controls the amount of generation of the micro-nano bubbles to a proper level, enabling sending bubbles stably.

Figure 14:
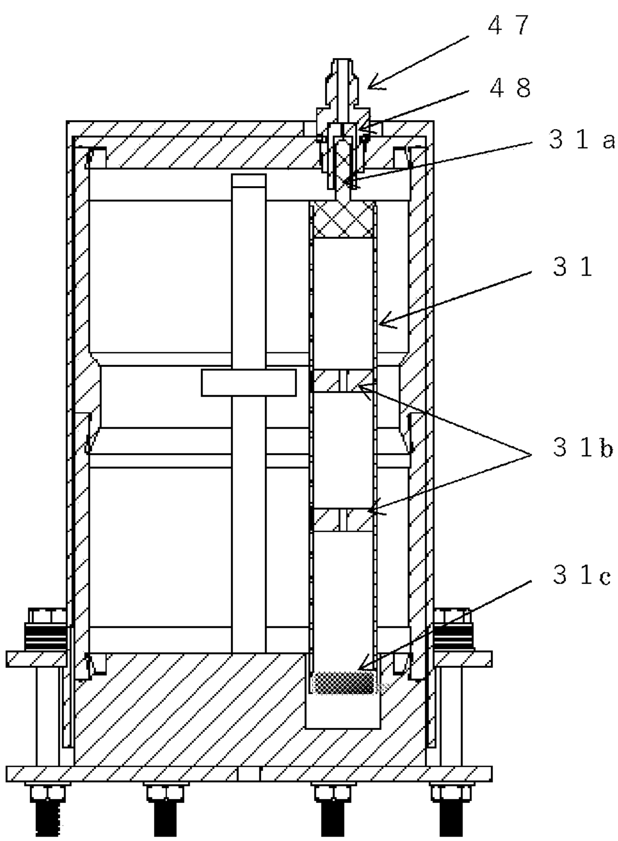
FIG. 14 is a cross sectional view of a float part to be equipped on the gas-liquid mixing vessel.

FIG. 14 illustrates a cross sectional view of a part of the float 31 shown in FIG. 12. The structure of the float pipe 31 comprises a float tip part 31*a* (which is tapered toward its end), a reinforcing rib 31*b* for prevention of collapse by the pressure of liquid, and a stop plug 31*c*.

Mixing the gas and the liquid requires its method to increase the dissolving efficiency of the gas into the liquid by enlarging the contact area of the gas and the liquid. If the efficiency lowers, shortage of the generation amount occurs due to a shortage of the gas, which is a fatal problem in the generating of micro-nano bubbles.

We examined how much the amount of generated micro-nano bubbles will be increased depending on the degree of control over the amount of the gas and the liquid. As a result, it was understood that the following are points of interest. If the amount of the liquid in the volume ratio inside the gas-liquid mixing vessel occupies 60% and the amount of the gas occupies 40%, the gas-liquid ratio is the ideal balance of amounts. To stabilize the amount of generation of the micro-nano bubbles and to increase the amount of generated bubbles, it is necessary that the condition of the mixing of the gas to be dissolved and the liquid should be optimized by exhausting the excess gas from an excess gas exhausting port 48 of a float socket 47 using the buoyancy of the float 31 caused by the liquid for controlling their ratio automatically. In the present invention, for the purpose of increasing greatly the amount of generation of micro-nano bubbles, it is preferable to control the volume ratio of the gas and the liquid in the gas-liquid mixing vessel within the range of gas to liquid ratio=50:50 to 5:95 so that the liquid will occupy more part in the volume ratio. Also in the present invention, the float 31 may be installed outside the gas-liquid mixing vessel, instead of installing inside. In this arrangement, connecting the inside and outside of the gas-liquid mixing vessel using such as a communication pipe permits controlling the volume ratio of the gas and the liquid.

Figure 15:
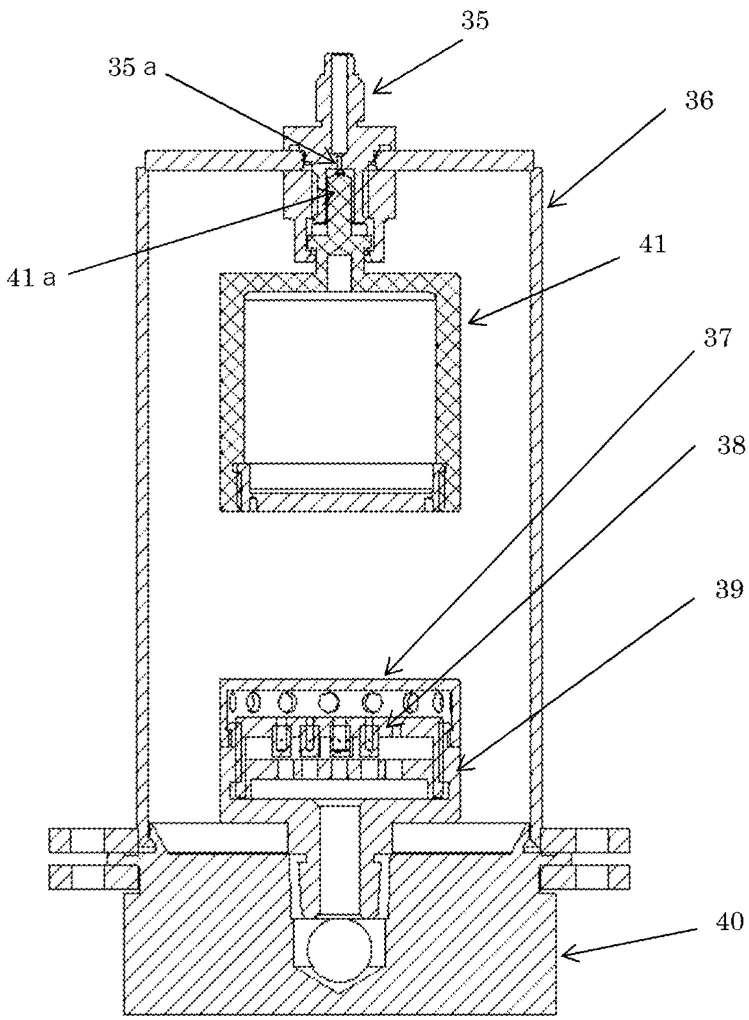
FIG. 15 is a cross sectional view of the gas-liquid mixing vessel having a bubble generating nozzle by the present invention.

FIG. 15 is an example of a gas-liquid mixing vessel that has more improved efficiency. The fundamental working is same as those illustrated in FIGS. 12 and 13. This vessel is a gas-liquid mixing vessel structured based on a gas-liquid mixing vessel comprising a gas-liquid mixing vessel outer frame 36, a micro-nano bubble generating nozzle 38, and a member 40, wherein a structure resistible to the internal pressure of the gas-liquid mixing vessel is given to the basic structure. The mixing of a gas and a liquid is efficiently performed inside that vessel.

In FIG. 15, each of the reference numerals denotes:

36: the gas-liquid mixing vessel outer frame;

41: a float;

35: a float holder;

35*a*: an excess gas exhausting port on float holder; and

41*a*: a float tip, wherein the float tip 41*a* has a function that regulates automatically the excess gas.

When using a conventional apparatus that generates a less amount of micro-nano bubbles, a major method for generating an increased amount of micro-nano bubbles is as follows. The method is comprised of processes of: generating micro-nano bubbles once in a water tank; pumping up micro-nano bubbles generated in the water tank again; injecting an additional gas to be dissolved into the pumped bubble-containing liquid at the gas-liquid mixing vessel; and circulating the gas-injected bubble-containing liquid multiple times to bring the bubble-containing liquid to a state in which a large amount of micro-nano bubbles are involved. Thereby, micro-nano bubbles are generated in an increased amount.

In this method, it is difficult to control the amount of generation of the micro-nano bubbles. Further, a circulating technique invites trouble such as occurrence of contamination. Because of that, an apparatus that is capable of generating a large amount of micro-nano bubbles in one process without use of a circulation technique is desired.

Therefore, it is intended to generate micro-nano bubbles, without circulation in the gas-liquid mixing vessel to be used in the present invention, by a liquid-collision in the gas-liquid mixture state under the working of the micro-nano bubble generating nozzle 38, which is held on a nozzle holder 39, having a structure same as illustrated in FIG. 8.

In this situation, it is the requisite condition that the nozzle 38 arranged inside the gas-liquid mixing vessel should issue the liquid of the gas-liquid mixture state at a flow rate more than that of the nozzle 11 arranged at the distal end to increase the pressure inside the gas-liquid mixing vessel. If the flow rate of the nozzle 38 is smaller, micro-nano bubbles sometimes may not be generated from the nozzle attached at the distal end.

The effect of the installing of the nozzle 38 inside the gas-liquid mixing vessel is that one-path of processing along the gas-liquid mixing vessel to the nozzle permits a stable generation of a large amount of micro-nano bubbles. Thereby, such technique enables provision of an apparatus suitable for washing process in semiconductor manufacturing line for example.

In the present invention, configuring gas-liquid mixing vessels in a multi-stage cascade makes it possible to generate a larger amount of micro-nano bubbles; this is a useful means for generating a large amount of bubbles.

Figure 16:
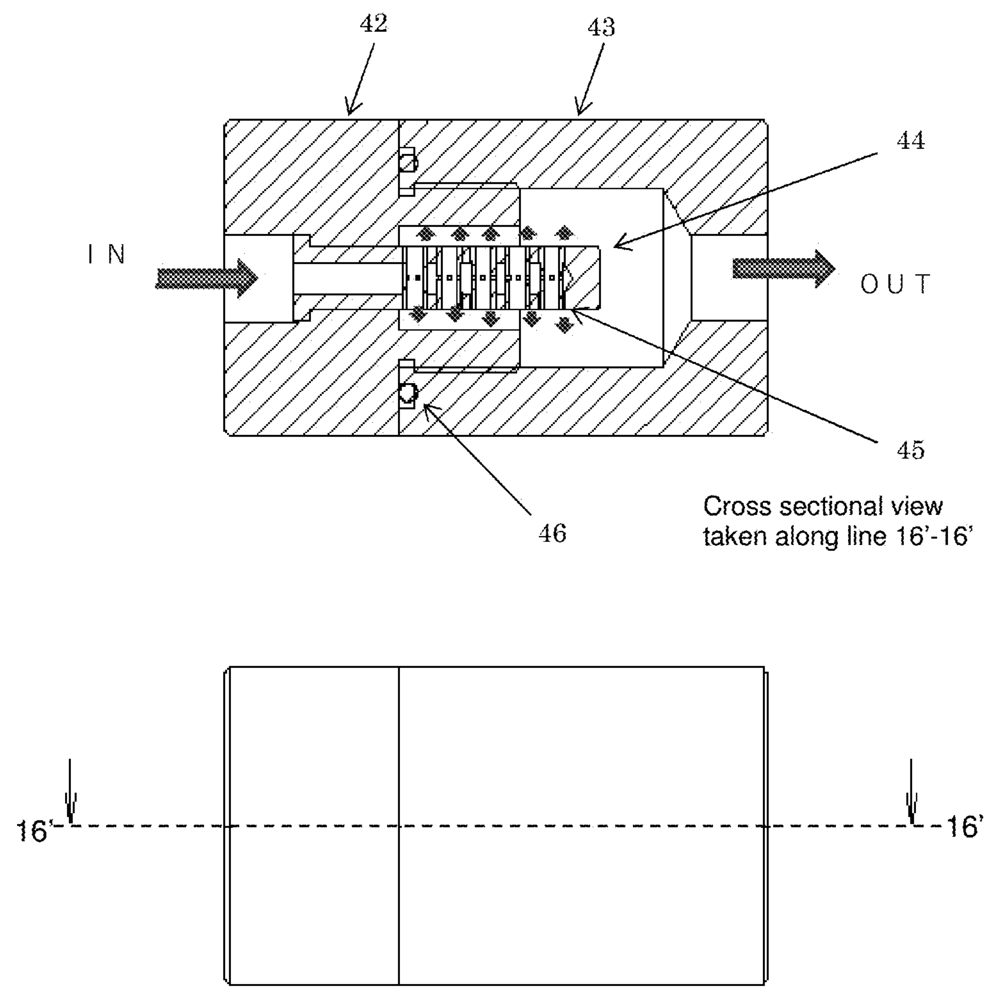
FIG. 16 is a cross sectional view of a multi-row nozzle of another configuration that generates micro-nano bubbles.

FIG. 16 showing a cross-section along a line 16'-16', offers another method for generating micro-nano bubbles. This method employs an arrangement in which two or more small-hole nozzles 45 are arrayed perpendicular to the incoming or discharging direction (longitudinal direction) of the flow of the gas-including liquid. This array is different from the parallel arrangement illustrated in FIG. 8. The arrangement illustrated in FIG. 16 has an advantage in that a desired flow rate is easily ensured, because the small-hole nozzles are arrayed as the figure shows with respect to the outer cases 42 and 43, a packing 46, and a nozzle hole 44; and thereby the small-hole nozzles become to have discharging ports on their both sides.

As can be seen in FIG. 16, the gas-liquid mixture liquid fed from the port IN is brought into a water hammering state by the nozzle 45 to generate micro-nano bubbles, and then discharged to the both sides of the nozzle. This ensures the flow rate as desired and the efficiency is doubled, therefore the energy needed for generating micro-nano bubbles becomes half.

Bubbles like this produced by the water hammering gives less damage to the nozzle structure, because collision occurs only between the liquid. Therefore, it is possible to make a bubble generating apparatus have a longer service life.

The significant feature of the method and the apparatus for generating micro-nano bubbles by the present invention is that they are compatible with using pure water as a gas-including liquid that does not include any foreign matters such as nucleating agents in an application to washing and sterilization of semiconductor devices and food. Granted that a use of the nucleating agents, or the like, is needed to increase the amount of generation of micro-nano bubbles, the quantity of addition of such material into pure water can be considerably reduced. In the present invention, tap water, well water, or spring water such as natural water other than pure water can be used in consideration of the supply state or usability. Further in the present invention, the strengthening of the oxidizing action of the dissolved liquid and the reformulating of the liquid for enhancing permeability required for impurity removing action may be practicable to increase the effectiveness of the washing and sterilizing.

The method for strengthening the oxidizing action of the dissolved liquid stated above includes the use of the gas-including liquid which is an aqueous solution prepared by adding, to pure water, at least one of oxidant selected from the group consisting of ozone, oxygen, hydrogen peroxide, chloric acid, perchloric acid, and potassium permanganate. Among these oxidant, ozone and oxygen are preferable oxidant for the present invention, because they have little adverse effect as an additive and their environmental load is very small.

As the method for enhancing the permeability for impurity removing action in the gas-including liquid stated above, it is a preferable method to add a gas selected from the group consisting of carbon dioxide, hydrogen gas, and nitrogen gas, which has excellent permeability for impurity removing action. On generation of micro-nano bubbles, carbon dioxide, hydrogen gas, or nitrogen gas invades easily the boundary surfaces between a semiconductor device and impurities, such as residuals of resist, adhering to its surface. Thereby, the effectiveness of the washing is largely increased. Further, since carbon dioxide or nitrogen gas is harmless to human body, such gas is suitable for the present invention as a reformulating additive.

The structure and shape of the micro-nano bubble generating nozzle by the present invention will be detailed referring to concrete embodiments.

First Embodiment

Figure 17A:
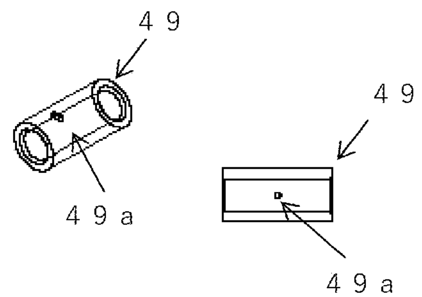
FIGS. 17A to 17E are a perspective view and a cross sectional view of the structures of the liquid-collision nozzles by the present invention.

FIGS. 17A-E illustrate the structure and shape of the liquid-collision nozzle which was examined to generate micro-nano bubbles using a water hammering power. FIG. 17A illustrates a comparative example to the embodiment of the present invention and FIGS. 17B to 17E illustrate embodiments of the present invention.

FIG. 17A illustrates a configuration that a hole 49*a* is made in the circumference of a hollow cylinder. In this comparative example, which has the hole 49*a* of one small through-hole, the gas-including liquid squirted at a speed V collides against the wall of a pipe 49. Therefore, the amount of generated micro-nano bubbles is not much and there is a disadvantage in that the impact by the collision against the wall may damage the wall.

Figure 17B:
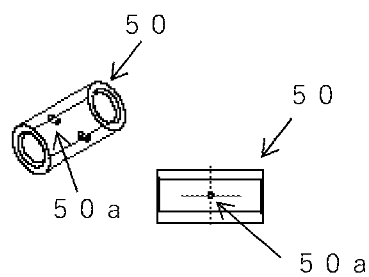

A liquid-collision nozzle illustrated in FIG. 17B has two holes 50*a* configured with two small through-holes. In this embodiment, the gas-including liquid squirting at a speed V actualizes a collision at a speed of 2V, because the two holes 50*a* provides another spout at the opposite side. Thus, the collision energy becomes higher than that of the comparison example of FIG. 17A.

Figure 17C:
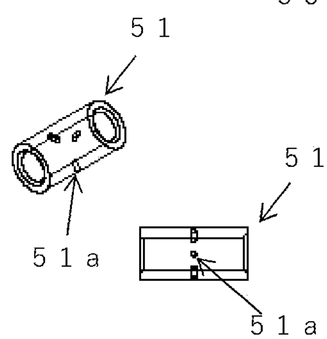

A liquid-collision nozzle illustrated in FIG. 17C has three holes Ma configured with three small through-holes. In this embodiment, the gas-including liquid squirts at a speed V from three holes provided at an interval of 120 degree for collision. Thereby, the energy in the center of collision of the liquid squirted at a speed V becomes three times. This means that, when the collision is produced using three spouts and when the collision energy same as the one in the former two-hole case is considered to be enough, the collision produces still the same amount of energy even if the speed V is reduced by as much as 20%. Since the pump pressure determines the speed V, even a lowered pump pressure is still capable of generating micro-nano bubbles.

Figure 17D:
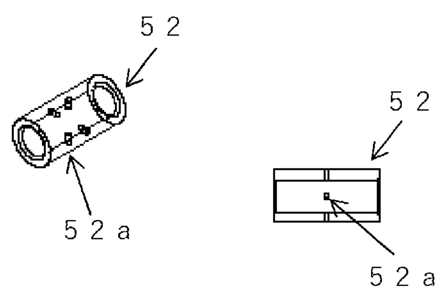

A liquid-collision nozzle illustrated in FIG. 17D has four holes 52*a* configured with four small through-holes. In this embodiment, the gas-including liquid squirts at a speed V from four holes provided at an interval of 90 degree for collision. Thereby, the energy in the center of collision of the liquid squirted at a speed V becomes four times. This means that, when the collision is produced using four spouts and when the collision energy same as the one in the former two-hole case is considered to be enough, the collision produces still the same amount of energy even if the speed V is reduced by as much as 30%. Since the pump pressure determines the speed V, even a lowered pump pressure is still capable of generating micro-nano bubbles.

Figure 17E:
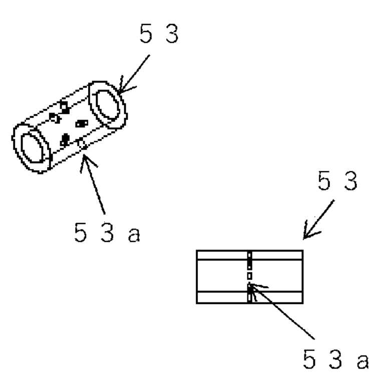

A liquid-collision nozzle illustrated in FIG. 17E has five holes 53*a* configured with five small through-holes. In this embodiment, the gas-including liquid squirts at a speed V from five holes provided at an interval of 72 degree for collision. Thereby, the energy in the center of collision of the liquid squirted at a speed V becomes five times. This means that, when the collision is produced using five spouts and when the collision energy same as the one in the former case configured with two through-holes is considered to be enough, the collision produces still the same amount of energy even if the speed V is reduced by as much as 40%. Since the pump pressure determines the speed V, even a lowered pump pressure is still capable of generating micro-nano bubbles.

As stated above, micro-nano bubbles, which were not generated without a high-pressure pump, can be generated in a large amount by optimizing the structure and arrangement of the through-hole of the liquid-collision nozzle even if the pump pressure is 0.2 MPa; thus this technique is able to actualize energy-saving.

Second Embodiment

Figure 18A:
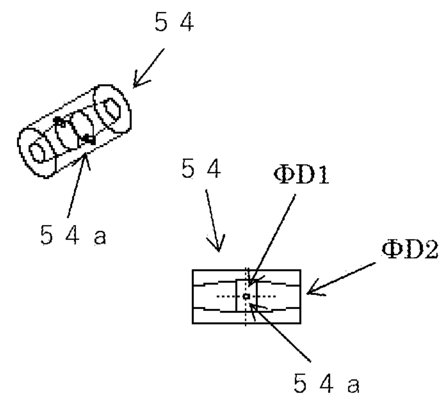
FIGS. 18A and 18B are a perspective view and a cross sectional view of the structures and shapes of the nozzle cylinders by the present invention.
Figure 18B:
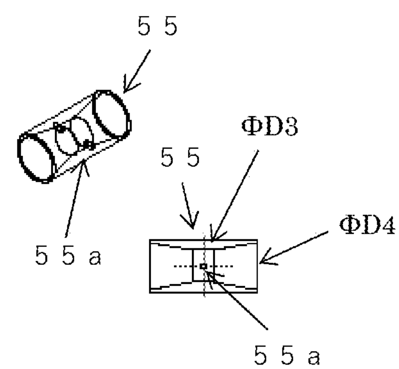

Referring to FIGS. 18A-B, the following explains a diameter-related feature in the liquid-collision nozzle by the present invention that generates micro-nano bubble. The explanation describes the relationship between the diameter of a micro-nano bubble discharging port to be provided on the end of a hollow cylinder and the diameter of the hollow cylinder at its part where through-holes are arranged in the circumferential direction.

FIG. 18A illustrates a liquid-collision nozzle having two holes Ma. In a nozzle cylinder 54, the diameter of the part (the part in which the small through-hole is made) against which the jet of liquid collides is made large, referred to as D1, and the diameter of a discharging port is made small, referred to as D2. With this configuration, pressure is immediately imposed on micro-nano bubbles generated by the collision. Thereby, the composition of micro-nano bubbles can be controlled. That is, this diameter configuration works as a means for controlling the distribution of particles in micro-nano bubbles and therefore an advantageous effect is brought in the miniaturization of particles.

A liquid-collision nozzle illustrated in FIG. 18B has two holes 55*a*. In a nozzle cylinder 55, the diameter of the part against which the jet of liquid collides is made small, referred to as D3, and the diameter of a discharging port is made large, referred to as D4. With this configuration, a pressure is not imposed on micro-nano bubbles generated by the collision. Therefore, the distribution of particles of micro-nano bubbles which expand on generation becomes a little large.

In the present invention, either of the nozzles having the structure illustrated in FIG. 18 may be used. The nozzle cylinder shown in FIG. 18A has such a structure that the diameter of the discharging port is smaller than the diameter of the collision occurring part of the nozzle cylinder; therefore, the pressure of the gas-including liquid in the vicinity of the spout becomes high. Because of that, even though there is an advantageous effect for miniaturization of micro-nano bubble particles, the bubble generation is a little bit impeded. As a consequence to this, the lowering of the amount of generated bubbles, or the late-generating of bubbles at a place away from the spout, may occur. In contrast to this, the nozzle having the structure illustrated in FIG. 18B is able to generate a large amount of bubbles stably, because the nozzle allows pressure release at its discharging port. Since it is possible to regulate the miniaturization of micro-nano bubbles by the diameter of the small through-hole of the nozzle, the nozzle illustrated in FIG. 18B is suitable.

Third Embodiment

Figure 19:
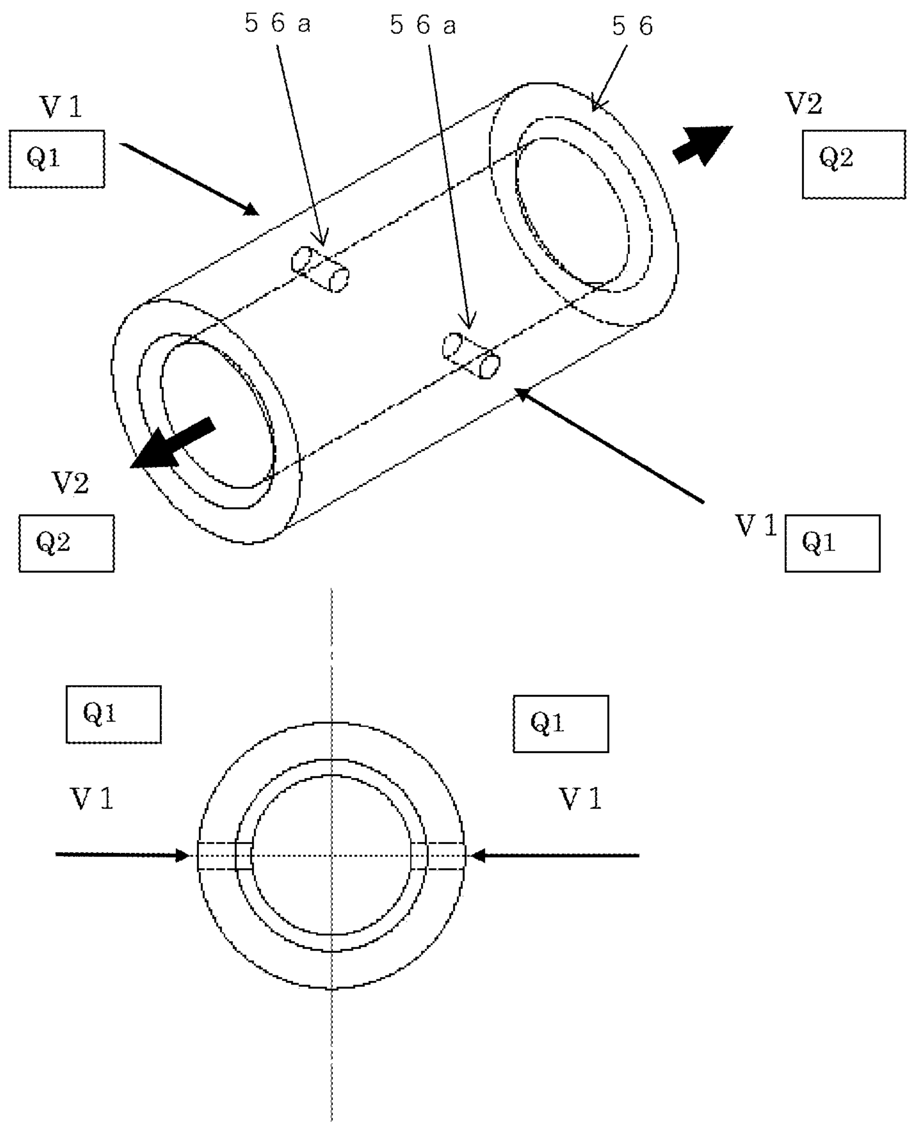
FIG. 19 is an illustration that shows the relationship between the flow rate of the jet squirted from the small through-hole of the liquid-collision nozzle and the flow rate of the discharge from the discharge port.
Figure 20:
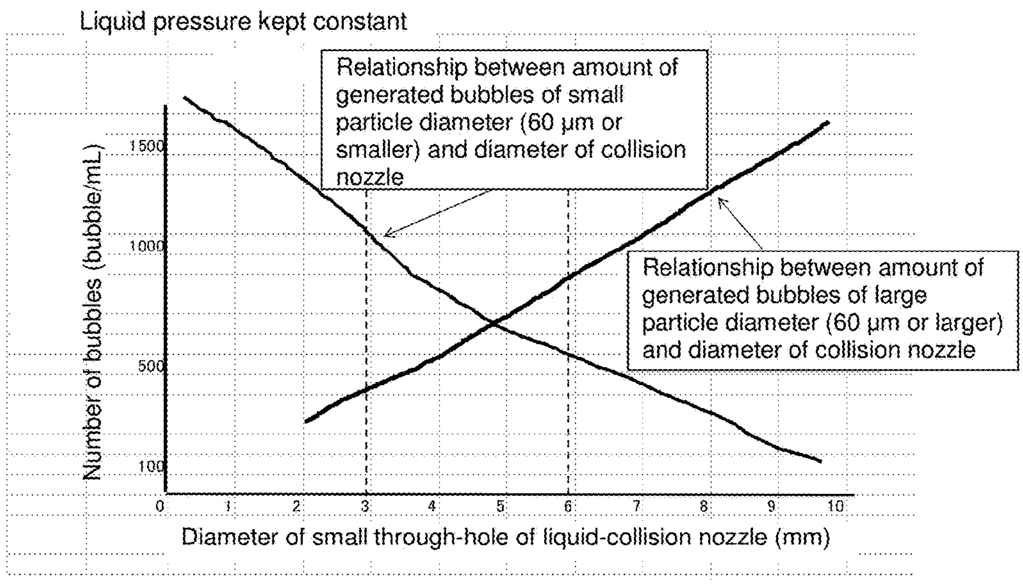
FIG. 20 is a graph that shows schematically the relationship between the diameter of the small through-hole of the liquid-collision nozzle and the number of bubbles per unit volume.
Figure 21:
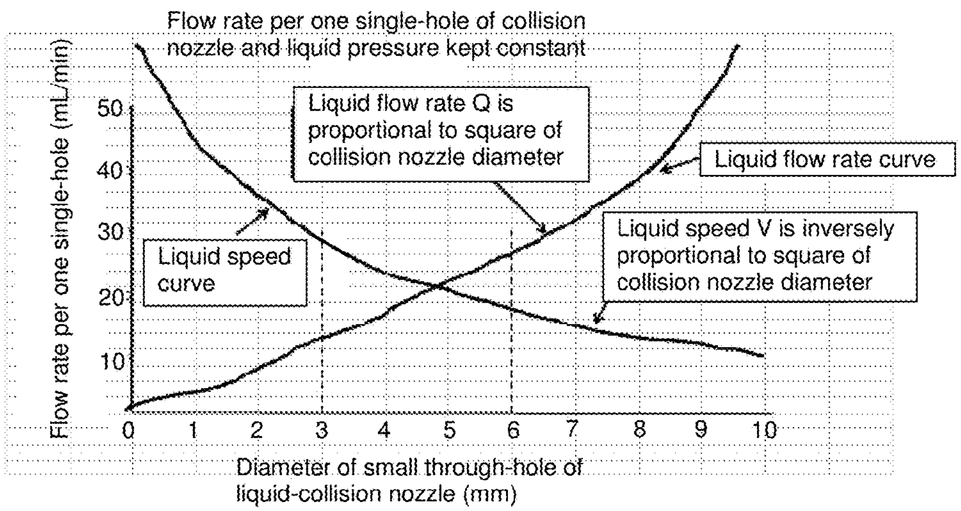
FIG. 21 is a graph that shows the relationship between the diameter of the small through-hole of the liquid-collision nozzle and the flow rate Q at the nozzle.

Regarding a liquid-collision nozzle illustrated in FIG. 18B, the relationship between the diameter of the liquid-collision nozzle and micro-nano bubbles is explained referring to FIGS. 19 to 21, wherein the pressure is kept constant and pure water, which includes 50 ppm of ozone, is used as the dissolved liquid.

FIG. 19 illustrates the relationship between the flow rate of the jet squirted from the small through-hole of a nozzle 56 and the flow rate of the discharge issued from the discharge port. In FIG. 19, the gas-including liquid squirted from a small through-hole 56*a* at a speed V1, after its squirting from a single-hole 56*a* at a liquid rate Q1 per second, collides to generate micro-nano bubbles. Then, it goes out from the discharge port of the nozzle 56 at a speed V2 with a liquid rate Q2 per second. Here, the flow rates Q1 and Q2 are same.

FIG. 20 shows the relationship between the diameter of the small through-holes of the liquid-collision nozzle and the amount of generation of micro-nano bubbles. In this graph, the amount of generated micro-nano bubbles is plotted in the number of bubbles generated per unit volume of the gas-including liquid. As can be known from FIG. 20, when the diameter of the small through-holes of the liquid-collision nozzle becomes larger, V1 reduces and the liquid rate Q1 increases. In this case, the amount of generated micro bubbles (60 μm or larger in diameter) increases, but the amount of generated nano bubbles reduces. On the other hand, when the diameter of the small through-holes of a liquid-collision nozzle becomes smaller, the liquid rate Q1 reduces. In this case, the amount of generated micro bubbles (60 μm or larger in diameter) reduces and V1 increases, but the amount of generated nano bubbles (2 μm or smaller in diameter) increases.

Thus, the diameter of the small through-holes of the liquid-collision nozzle is an important factor that determines the performance of the micro-nano bubbles. Although there is a difference in behavior depending on the nature of the liquid and the gas to be dissolved, the tendency is as described in the above. Therefore, the amount of micro-nano bubbles can be controlled by adjusting the diameter of the small through-holes of the liquid-collision nozzle.

FIG. 21 shows the relationship between the diameter of the small through-holes of the liquid-collision nozzle and the flow rate Q. Where the liquid pressure is kept constant, the flow rate Q is proportional to the square of the diameter of the small through-holes of the liquid-collision nozzle, but the liquid speed V is inversely proportional to the square of the diameter of the small through-holes of the liquid-collision nozzle. Thus, the relationship between the diameter of one single-hole of the small through-holes of the liquid-collision nozzle and the flow rate Q is as shown in FIG. 20. The optimization of the diameter of the small through-holes of the nozzle is possible by determining the number of holes of the liquid-collision nozzles in view of the required flow rate.

As can be known from FIG. 20, it is necessary in the present invention that the small through-holes of the nozzle should have a diameter of 0.1 to 6.0 mm. If the diameter of the small through-holes of the nozzle is smaller than 0.1 mm, the amount of generation of small-size bubbles of about 60 μm or smaller in particle diameter increases. However, the amounts of generation of bubbles having larger diameters than that particle diameter decreases sharply; then, micro-nano bubbles are hardly generated. In addition, if the diameter of the small through-holes of the nozzle is in excess of 6 mm, the total amount of generated bubbles increases. On the contrary however, the amount of generation of small-size bubbles of about 60 μm or smaller in particle diameter decreases sharply to 500 bubbles per mL or less; thus, it is not possible to achieve a sufficient effect of the present invention. It is more preferable in the present invention that the diameter of the small through-holes of the liquid-collision nozzle should be configured within a range of 0.1 to 3 mm to generate micro-nano bubbles in a large amount of 1000 bubbles per mL or more.

Fourth Embodiment

Figure 22:
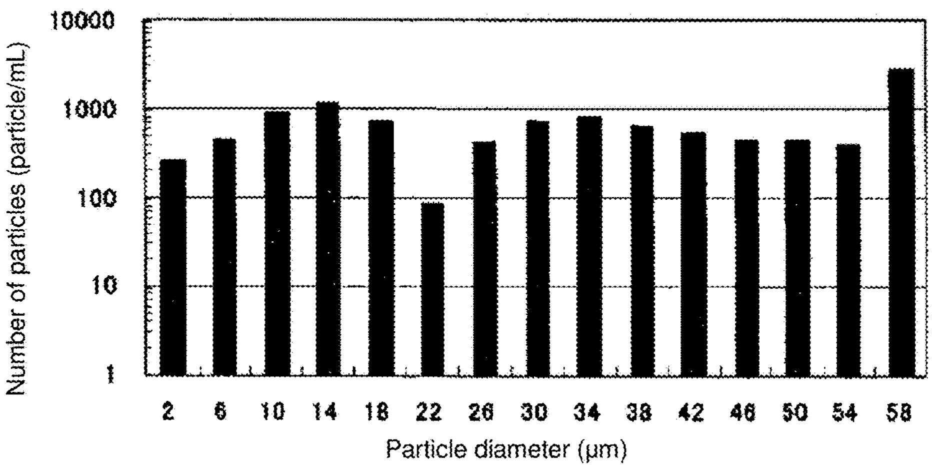
FIG. 22 is a graph that shows the amount of bubbles generated by the method for generating micro-nano bubbles by the present invention and the particle diameter of the generated bubbles.
Figure 23:
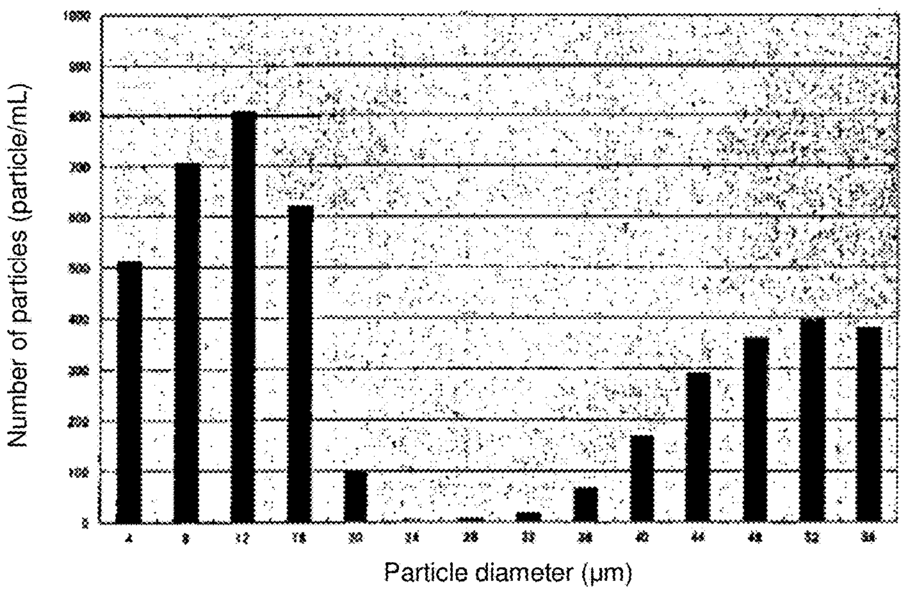
FIG. 23 is a graph that shows the amount of bubbles generated by a conventional gas-liquid two-phase swirl flow method and the particle diameter of the generated bubbles.

Micro-nano bubbles were generated using distilled water as the gas-including liquid with the apparatus for generating micro-nano bubbles by the present invention as illustrated in FIGS. 1 and 2. The nozzle used had the same structure as illustrated in FIGS. 3 and 4, and the nozzle parts 3*b* and 4*b* were given a straight shape of a small through-hole of 0.5 mm in diameter. In addition, as a comparison example, micro-nano bubbles were generated by the conventional gas-liquid two-phase swirl flow method using, similarly to the above, distilled water as the dissolved liquid. FIGS. 22 and 23 show the relationship between the amount of generated bubbles and the particle diameter of bubbles. FIG. 22 shows the amount generated by the method for generating micro-nano bubbles by the present invention and FIG. 23 shows the same using the gas-flow two-phase swirl flow method. The amount of generated bubbles is indicated in the number of bubbles per unit volume of the distilled water (bubble/mL). The amount of generated bubbles and their particle diameter are determined using a submerged particle counter at room temperature. FIGS. 22 and 23 do not show the amount of bubbles having particle diameters in the nano region; this is because of the difficulty in measuring the number of particles in the nano region with an optical method.

Comparison of the results shown in FIGS. 22 and 23 teaches that the method for generating micro-nano bubbles by the present invention generates a larger amount of bubbles compared to the amount generated by the conventional gas-liquid two-phase swirl flow method over the entire particle diameter region of about 60 μm or smaller. Particularly, the difference in the region of the bubble particle diameter of 20 to 40 μm is considerable. In addition, comparison of both methods for the region of the bubble particle diameter of 2 to 10 μm tells that the generated bubbles by the present invention is equal to or slightly larger than that by the conventional method in the amount. By analogy from the results of the number of generated bubbles in the region of a small particle diameter, the present invention can be considered to be a method that generates a large number of bubbles in the sub-micron region, i.e., even in the nano region. A use of the apparatus for generating micro-nano bubbles by the present invention for the washing semiconductor wafers and the sterilization of food such as vegetables actually has confirmed that the effect of washing or sterilization continued even when the gas-including liquid became an apparent-clear solution over time, like a bubble-disappeared liquid. This means that the present invention gains an effect of being able to continue rendering a washing and sterilization effect by generating micro-nano bubbles, for a long time more than the conventional method would provide. It is understood that the existence of nano-bubbles, which is large in the amount, having smaller diameter of less than 1 μm has produced such an effect.

As stated above, the method for generating micro-nano bubbles by the present invention generates micro-nano bubbles using the water hammering power. Therefore, the method is able to generate micro-nano bubbles in a large amount using pure water only without use of substances which are not necessarily needed such as nucleating agents. Accordingly, the method can realize a clean washing and sterilization. Since this water hammering power is maximized by the use of a bubble generating nozzle having an optimized structure and shape and by an apparatus that is able to stably perform the generation of a large amount of bubbles, the application of such combination makes it possible to perform the continuous and stable generation of bubbles in an efficient manner. Thereby, the amount of generation of small-size bubbles, not only of the size of micrometer order but also of nanometer order, can be increased together. This feature enhances the capability and function in the washing and sterilizing more than those in conventional techniques.

Further, for a clean washing that is incompatible with metal ions which a wetted part generates, configuring a pump or piping, or both, in a washing apparatus with plastic or preferably with fluorine resin makes the apparatus become to have a high reliability and a clean feature. Thus, the apparatus for generating micro-nano bubbles by the present invention is applicable to the clean washing for such as semiconductor wafers. Conventionally, the washing of semiconductor wafers has used processing with such as strong acid treatment, alkaline neutralization, and pure water rinsing. The process therefore has been complicated and the environmental load has been large because, for example, the process uses drug solutions. However, the present invention is able to solve this problem. Further, the process burden such as in the disposal of drug solutions is eliminated and the required scale for semiconductor manufacturing equipment becomes small and related process is made compact; these are a great industrial value.

Further, in the semiconductor wafer washing, the use of a micro-nano bubble-generated liquid, other than pure water, improves the washing effect largely and makes the washing process very simple with the washing equipment downsized. The micro-nano bubble-generated liquid for such use is prepared by adding a gas having excellent oxidizing ability like oxygen or a permeable impurity removal agent such as carbon dioxide or nitrogen gas, and then followed by the micro-nano bubble generation process by the present invention. Thereby, the washing becomes environment friendly. Further, the process burden such as in the disposal of drug solutions is eliminated and the required scale for semiconductor manufacturing equipment becomes small and related process is made compact; these are a great industrial value.

The micro-nano bubble generating system by the present invention is applicable to a medical use, because the system uses micro-nano bubbles generated by a clean system that uses pumps and wetted part made of fluorine resin. Therefore, it is expected that the field of the application of the invented system will expand greatly.

Further, the capability of the washing and sterilization by micro-nano bubbles that uses oxygen or ozone as its constitution gas can be applied not only to the semiconductor field but also to fields of foods and vegetables. Thus, there is a possibility in that the application range may expand to the fields such as agriculture and fisheries; and the method for generating micro-nano bubbles, the bubble generating nozzle, and the apparatus for generating micro-nano bubbles by the present invention have a very high superiority in such field expansion movement.

The invention claimed is:

1. A method for generating micro-nano bubbles having a diameter of 60 μm or smaller, using water hammering power, the method comprising:

producing jets of a gas-including liquid by injecting the liquid from an outside of a cylinder via two or more through-holes in the cylinder, at a pressure higher than an atmospheric pressure, the two or more through-holes having a diameter of 0.1 to 6.0 mm, arrayed in the circumferential direction thereof with such a configuration that respective openings of the two or more through-holes are arranged facing each other in a same plane;

creating a collision of the jets of the gas-including liquid inside the cylinder; and generating micro-nano bubbles having a diameter of 60 μm or smaller, by a mutual collision of the jets of the gas-including liquid, wherein, in order to maintain an inflow direction of the gas-including liquid unchanged until reaching an inlet position of the through-holes, the cylinder is either arranged perpendicularly to the inflow direction of the gas-including liquid so as to align the openings of the through-holes with the inflow direction thereof, or arranged in parallel to the inflow direction of the gas-including liquid using a cylinder which has one end formed into a closed tube-like shape and an outer wall with a smaller cross-sectional area than that of an introduction port of the gas-including liquid, provided inside a nozzle case for feeding the gas-including liquid to the cylinder.

2. The method for generating micro-nano bubbles according to claim 1, comprising:

a sucking process that sucks a gas and a liquid;

a pressurization process that pressurizes the gas and the liquid;

a dissolved gas enriching process, wherein the pressurized gas-including liquid is mixed with another new gas; and a dissolved gas miniaturization process that generates micro-nano bubbles, wherein the pressurized gas-including liquid prepared at the dissolved gas enriching process is injected from the outside of the cylinder having the two or more through-holes with the diameter of 0.1 to 6.0 mm, arrayed in the circumferential direction thereof with such a configuration that the respective openings of the two or more through-holes are arranged facing each other in the same plane via the through-holes at a pressure higher than the atmospheric pressure to produce jets of the liquid, and the jets are collided mutually inside the cylinder.

3. The method for generating micro-nano bubbles according to claim 1, wherein the pressure higher than the atmospheric pressure is between 0.2 and 0.6 MPa, and the diameter of the through-holes leading to the hollow of the cylinder is between 0.1 and 3.0 mm.

4. The method for generating micro-nano bubbles according to claim 1, wherein the liquid of the gas-including liquid comprises at least one substance selected from the group consisting of ozone, oxygen, hydrogen peroxide, chloric acid, perchloric acid, and potassium permanganate.

5. The method for generating micro-nano bubbles according to claim 1, wherein the gas of the gas-including liquid comprises at least one substance selected from the group consisting of carbon dioxide, hydrogen gas, and nitrogen gas.

6. An apparatus for generating micro-nano bubbles having a diameter of 60 μm or smaller, using water hammering power created by a mutual collision of jets of a gas-including liquid, comprising:

a gas port, a liquid pipe and a regulating valve for sucking each of a gas and a liquid;

a pump for pressurizing the gas and the liquid in a mixture and transferring them;

a gas-liquid mixing vessel for enriching the dissolved gas by mixing the transferred liquid, which includes the gas, with new gas; and a bubble generating nozzle for generating micro-nano bubbles using the gas-including liquid prepared in the gas-liquid mixing vessel, wherein the bubble generating nozzle comprises:

a hollow cylinder having two or more through-holes with a diameter of 0.1 to 6.0 mm, arrayed in the circumferential direction thereof with such a configuration that the respective opening of each of the two or more through-holes faces each other in the same plane; and a micro-nano bubble discharge port provided on at least one end of the hollow cylinder, wherein the through-holes are arranged so that all of their extension lines passing through respective center of the cross-section of each of the through-holes intersect each other in the inside of the hollow of the cylinder;

wherein, in order to maintain the inflow direction of the gas-including liquid unchanged until reaching the inlet position of the through-holes, the hollow cylinder is arranged either perpendicularly to an inflow direction of the gas-including liquid so as to align openings of the through-holes with the inflow direction thereof, or arranged in parallel to the inflow direction of the gas-including liquid using a cylinder which has one end formed into a closed tube-like shape and an outer wall with a smaller cross-sectional area than that of an introduction port of the gas-including liquid, provided inside a nozzle case for feeding the gas-including liquid to the cylinder.

7. The apparatus for generating micro-nano bubbles according to claim 6, wherein the bubble generating nozzle has two or more hollow cylinders.

8. The apparatus for generating micro-nano bubbles according to claim 6, wherein the hollow cylinder has, in its longitudinal direction, two or more rows of the through-holes, each of the rows consisting of two or more of the through-holes with a diameter of 0.1 to 6.0 mm.

9. The apparatus for generating micro-nano bubbles according to claim 6, wherein the diameter of the through-holes that lead to the hollow of the hollow cylinder is between 0.1 and 3.0 mm.

10. The apparatus for generating micro-nano bubbles according to claim 6, wherein the diameter of the micro-nano bubble discharge port provided on at least one end of the hollow cylinder is equal to or larger than the diameter of a part of the hollow cylinder, wherein such part is such a part where the through-holes are arranged in a circumferential direction.

11. The apparatus for generating micro-nano bubbles according to claim 6, wherein, in the bubble generating nozzle for generating micro-nano bubbles, the gas-including liquid is squirted at a pressure of 0.2 to 0.6 MPa through the through-holes of the bubble generating nozzle.

12. The apparatus for generating micro-nano bubbles according to claim 6, wherein the gas-liquid mixing vessel has the bubble generating nozzle for generating micro-nano bubbles having a diameter of 60 μm or smaller, and the liquid that includes the gas transferred by the pump for pressurizing is discharged into the gas-liquid mixing vessel by the bubble generating nozzle.

13. The apparatus for generating micro-nano bubbles according to claim 6, wherein the gas-liquid mixing vessel has a float valve inside or outside the vessel to maintain a volume of the gas and the liquid and the internal pressure inside the vessel always within a prescribed range by discharging excess gas from the vessel.

14. The apparatus for generating micro-nano bubbles according to claim 6, wherein a pump or piping, or both, through which the gas-including liquid flows, is made of plastic.

15. The apparatus for generating micro-nano bubbles according to claim 14, wherein a pump or piping, or both, through which the gas-including liquid flows, is made of fluorine resin.

16. The apparatus for generating micro-nano bubbles according to claim 6, wherein the pump for pressurizing the liquid that includes the gas is a compressed-air driven or an electric motor driven bellows cylinder pump.

17. The apparatus for generating micro-nano bubbles according to claim 6, wherein the liquid of the gas-including liquid comprises at least one substance selected from the group consisting of ozone, oxygen, hydrogen peroxide, chloric acid, perchloric acid, and potassium permanganate.

18. The apparatus for generating micro-nano bubbles according to claim 6, wherein the gas of the gas-including liquid comprises at least one substance selected from the group consisting of carbon dioxide, hydrogen gas, and nitrogen gas.

19. The apparatus for generating micro-nano bubbles according to claim 17, wherein the gas of the gas-including liquid additionally comprises at least one substance selected from the group consisting of carbon dioxide, hydrogen gas, and nitrogen gas.

20. A method for generating micro-nano bubbles having a diameter of 60 μm or smaller, using water hammering power, the method comprising:

producing jets of a gas-including liquid by injecting the liquid from the outside of a cylinder via two or more through-holes in the cylinder, at a squirting pressure of 0.2 MPa to 0.6 MPa, the two or more through-holes having a diameter of 0.1 to 6.0 mm, arrayed in the circumferential direction thereof with such a configuration that the respective openings of such two or more small through-holes are arranged facing each other in the same plane;

creating a collision of the jets of the gas-including liquid inside the cylinder; and generating micro-nano bubbles having a diameter of 60 μm or smaller, by the mutual collision of the jets of the gas-including liquid, wherein, in order to maintain the inflow direction of the gas-including liquid unchanged until reaching the inlet position of the through holes, the cylinder is either arranged perpendicularly to an inflow direction of the gas-including liquid so as to align the openings of the through-holes with the inflow direction thereof, or arranged in parallel to the inflow direction of the gas-including liquid using a cylinder which has one end formed into a closed tube-like shape and an outer wall with a smaller cross-sectional area than that of an introduction port of the gas-including liquid, provided inside a nozzle case for feeding the gas-including liquid to the cylinder.

21. A method for generating micro-nano bubbles using water hammering power, the method comprising:

producing jets of a gas-including liquid by injecting the liquid from the outside of a cylinder via two or more through-holes in the cylinder, at a pressure higher than the atmospheric pressure, the two or more through-holes having a diameter of 0.1 to 6.0 mm, arrayed in the circumferential direction thereof with such a configuration that the respective openings of such two or more small through-holes are arranged facing each other in the same plane;

creating a collision of the jets of the gas-including liquid inside the cylinder; and generating micro-nano bubbles having a diameter of 60 μm or smaller, by the mutual collision of the jets of the gas-including liquid, wherein, in order to maintain the inflow direction of the gas-including liquid unchanged until reaching the inlet position of the through holes, the cylinder is arranged perpendicularly to an inflow direction of the gas-including liquid so as to align the openings of the through-holes with the inflow direction thereof, provided inside a nozzle case for feeding the gas-including liquid to the cylinder.

* * * * *